United States Patent
Chanda et al.

(10) Patent No.: US 10,409,586 B1
(45) Date of Patent: Sep. 10, 2019

(54) METHOD AND SYSTEM FOR DEVELOPING AND DELIVERING AN UPDATE ON HUMAN MACHINE INTERFACE (HMI) APPLICATION

(71) Applicant: Wipro Limited, Bangalore (IN)

(72) Inventors: Debasish Chanda, Maheshtala (IN); Swarup Mandal, Kolkata (IN); Souvik Dutta, Kolkata (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/942,502

(22) Filed: Mar. 31, 2018

(30) Foreign Application Priority Data

Feb. 16, 2018 (IN) .............................. 201841006076

(51) Int. Cl.
  *G06F 8/65* (2018.01)
  *G06F 16/27* (2019.01)
  *G06F 16/21* (2019.01)
  *G06F 8/60* (2018.01)
  *G06F 8/71* (2018.01)

(52) U.S. Cl.
  CPC ................ *G06F 8/65* (2013.01); *G06F 8/60* (2013.01); *G06F 8/71* (2013.01); *G06F 16/212* (2019.01); *G06F 16/27* (2019.01)

(58) Field of Classification Search
  CPC ................ G06F 8/65; G06F 8/71; G06F 8/60
  USPC ........................................ 717/170, 171, 168
  See application file for complete search history.

(56) References Cited

U.S. PATENT DOCUMENTS

| 5,999,947 | A  | * | 12/1999 | Zollinger | G06F 16/273 |
| 7,546,595 | B1 | * | 6/2009 | Wickham | G06F 8/65 717/168 |
| 8,245,218 | B2 | * | 8/2012 | Giambalvo | G06F 8/61 717/172 |
| 10,037,203 | B1 | * | 7/2018 | Chavez | G06F 8/656 |
| 2006/0010246 | A1 | | 1/2006 | Schulz et al. | |
| 2006/0178757 | A1 | * | 8/2006 | Grgic | G05B 19/042 700/9 |
| 2008/0092131 | A1 | * | 4/2008 | McIntyre | G06F 9/451 717/172 |

(Continued)

OTHER PUBLICATIONS

Goronzy & Beringer, "Integrated Development and on-the-Fly Simulation of Multimodal Dialogs," Interspeech (Sep. 4-8, 2005).

(Continued)

*Primary Examiner* — Phillip H Nguyen
(74) *Attorney, Agent, or Firm* — Pepper Hamilton LLP

(57) ABSTRACT

This disclosure relates generally to a human machine interface (HMI) application, and more particularly to method and system for developing and delivering the HMI application from a host service delivery platform (HSDP) to a target platform. In one embodiment, a method for delivering an update on the HMI application from the HSDP to the target platform is disclosed. The method may include determining a need for updating the HMI application on the target platform, which implements a previous version of the HMI application. Based on the need, the method may further include, generating a package based on a comparison between a database emulating a current version of the HMI application and a database emulating the previous version of the HMI application, and delivering the package for updating the HMI application on the target platform. The database may be implemented in a database schema.

18 Claims, 19 Drawing Sheets

---

1800

DETERMINE A NEED FOR UPDATING THE HMI APPLICATION ON THE TARGET PLATFORM 1801

↓

BASED ON THE NEED, GENERATE A PACKAGE BASED ON A COMPARISON BETWEEN A DATABASE EMULATING A CURRENT VERSION OF THE HMI APPLICATION AND A DATABASE EMULATING THE PREVIOUS VERSION OF THE HMI APPLICATION 1802

↓

DELIVER THE PACKAGE FOR UPDATING THE HMI APPLICATION ON THE TARGET PLATFORM 1803

(56) References Cited

U.S. PATENT DOCUMENTS

| | | | |
|---|---|---|---|
| 2010/0083243 A1* | 4/2010 | Mincarelli | G06F 8/61 |
| | | | 717/173 |
| 2012/0060228 A1* | 3/2012 | Katkar | G06F 21/10 |
| | | | 726/33 |
| 2017/0219357 A1* | 8/2017 | Pfeifle | G01C 21/28 |

OTHER PUBLICATIONS

Murali, "HMI in the Cloud: The Secret SAAS," 4 pages, (2010), Software Horizons Inc.

* cited by examiner

| State Name | <State Name> | | |
|---|---|---|---|
| State Function | | | |
| Type | Name | Parameter | |
| Entry | <Entry Func> | <Param1><Value1>;<br><Param2><Value2> | |
| Do | <Do Func> | <Param1><Value1>;<br><Param2><Value2> | |
| Exit | <Exit Func> | <Param1><Value1>;<br><Param2><Value2> | |
| Transition | | | |
| Trigger1 | <Guard11> | <Action11> | <Next State> |
| | <Guard12> | <Action12> | <Next State> |
| | ? | ? | ? |
| | <Guard1N> | <Action1N> | <Next State> |
| Trigger2 | <Guard21> | <Action21> | <Next State> |
| | <Guard22> | <Action22> | <Next State> |
| | ? | ? | ? |
| | <Guard2N> | <Action2N> | <Next State> |
| ? | ? | ? | ? |
| TriggerM | <GuardM1> | <ActionM1> | <Next State> |
| | <GuardM2> | <ActionM2> | <Next State> |
| | ? | ? | ? |
| | <GuardMN> | <ActionMN> | <Next State> |

FIG. 4

METHOD AND SYSTEM FOR DEVELOPING AND DELIVERING AN UPDATE ON HUMAN MACHINE INTERFACE (HMI) APPLICATION

This application claims the benefit of Indian Patent Application Serial No. 201841006076, filed Feb. 16, 2018, which is hereby incorporated by reference in its entirety.

FIELD

This technology relates generally to a human machine interface (HMI) application, and more particularly to method and system for developing and delivering the HMI application from a host service delivery platform (HSDP) to a target platform.

BACKGROUND

HMI applications may allow a user to interact with a computing system for performing various tasks. Examples of the HMI application may include, but are not limited to, industrial machine controller, in-vehicle onboard device interface, web-based HMI server, marine control system, and large or small scale automation. As will be appreciated, with continuous evolvement of technologies, the HMI applications may require updates over time so as to implement the advancements and improvements. Further, product solutions are increasingly getting differentiated based on user experience they offer. The HMI applications have, therefore, become a key component of driving product differentiations. In order to maintain product differentiation and level of engagement of the user, the HMI applications may require periodic updates that provide new and improved experience to the user. As a result, there may be a need for designing, developing, delivering, and deploying the HMI applications and their updated versions in a scalable manner.

Existing techniques may provide tools for automated code generation so as to accelerate the HMI development lifecycle. However, these tools may fall short of the capability needed to meet the above stated challenges. For example, these tools may face constraints for the reasons of non-availability of a target hardware which co-evolved with a HMI application and is thus compatible with the HMI application. Further, existing techniques may not be able to provide for fast deployment of the HMI application, fast enhancement of the HMI application, functional validation of the HMI application, delivering the HMI application in a scalable manner, and deployment of the HMI application in technology agnostic manner. Moreover, existing techniques may not provide enhanced user experience with respect to updating future variants of the HMI application without requiring complete installation.

SUMMARY

In one embodiment, a method for delivering an update on a human machine interface (HMI) application from a host service delivery platform (HSDP) to a target platform is disclosed. In one example, the method may include determining a need for updating the HMI application on the target platform, which may implement a previous version of the HMI application. Based on the determined need, the method may further include generating a package based on a comparison between a database emulating a current version of the HMI application and a database emulating the previous version of the HMI application. The database may be implemented in a database schema. The method may further include delivering the package for updating the HMI application on the target platform.

In one embodiment, a system for delivering an update on a HMI application from a HSDP to a target platform is disclosed. In one example, the system may include at least one processor and a computer-readable medium storing instructions that, when executed by the at least one processor, may cause the at least one processor to determine a need for updating the HMI application on the target platform, which may implement a previous version of the HMI application. Based on the determined need, the processor-executable instructions, on execution, may further cause the processor to generate a package based on a comparison between a database emulating a current version of the HMI application and a database emulating the previous version of the HMI application. The database may be implemented in a database schema. The processor-executable instructions, on execution, may further cause the processor to deliver the package for updating the HMI application on the target platform.

In one embodiment, a non-transitory computer-readable medium storing computer-executable instructions for delivering an update on a HMI application from a HSDP to a target platform is disclosed. In one example, the stored instructions, when executed by a processor, may cause the processor to determine a need for updating the HMI application on the target platform, which may implement a previous version of the HMI application. Based on the determined need, the stored instructions, when executed by the processor, may further cause the processor to generate a package based on a comparison between a database emulating a current version of the HMI application on the HSDP and a database emulating the previous version of the HMI application. The database may be implemented in a database schema. The stored instructions, when executed by the processor, may further cause the processor to deliver the package for updating the HMI application on the target platform.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a tabular representation of an exemplary BL database organization, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
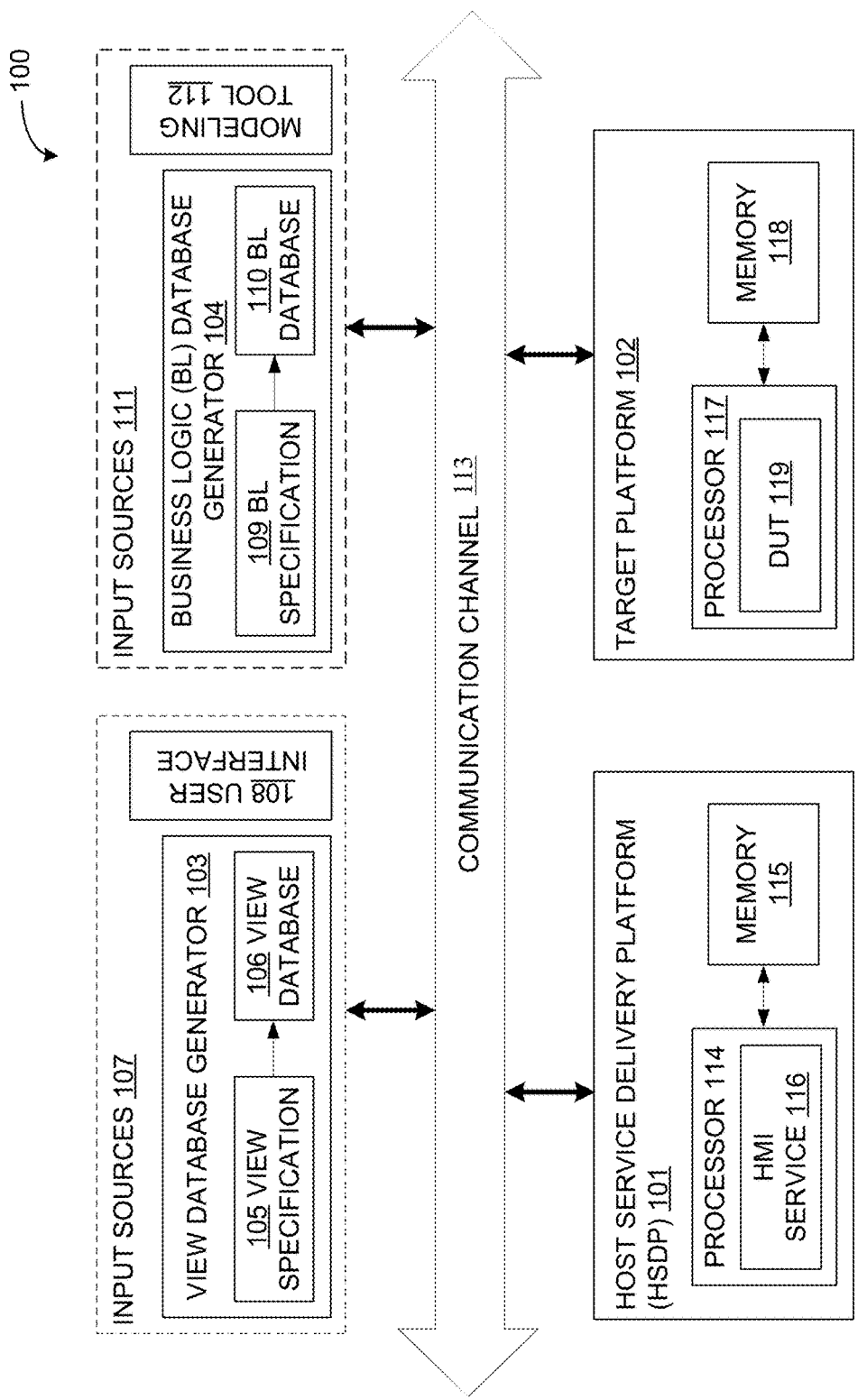
FIG. 1 is a block diagram of an exemplary system for developing and delivering a human machine interface (HMI) application from a host service delivery platform (HSDP) to a target platform, in accordance with some embodiments of the present disclosure.

Referring now to FIG. 1, an exemplary system 100 for developing and delivering a human machine interface (HMI) application from a host service delivery platform (HSDP) 101 to a target platform 102 is illustrated, in accordance with some embodiments of the present disclosure. In particular, the system 100 may deliver re-configurable HMI application (i.e., the HMI application and subsequent updates on the HMI application) from the HSDP platform 101 to the target platform 102 using a cloud-based service, also referred to as HMI as a Service (HaaS). As will be appreciated, a typical HMI application may include two primary component—a view component and a business logic (BL) component. The view component may be responsible for the look and feel of the HMI application and may provide a medium for a user to interact with the HMI application. The BL component may provide for control and functioning of the HMI application. For example, the BL component may be responsible for control and navigation action within the HMI application. The system 100 may deliver the re-configurable HMI application from the HSDP 101 to the target platform 102 by delivering the view component and the BL component and their subsequent updates using HaaS. The system may further enable reconfiguring the view component and the BL component on the target platform 102, thereby facilitating rapid development, validation, delivery, and deployment of the HMI application.

The system 100 may include the HSDP platform 101, the target platform 102, a view database generator 103, and a BL database generator 104. The view database generator 103 may receive a view specification 105 for generating a view component of the HMI application. The view database generator 103 may then emulate the view specification 105 into a view database 106. It should be noted that the view database generator 103 may receive the view specification 105 from one or more input sources 107. The view database generator 103 may further store the received view specification in a memory (not shown). Further, the view database generator 103 may employ a view database generation engine (not shown) that may emulate the view specification 105 into the view database 106. As will be described in greater detail below, the generated view database 106 may be implemented in a view database schema and stored in the memory (not shown). In some embodiments, the view database generator 103 may include a user interface 108 that allow user to create and preview the view prior to submitting the view specification to the view database generation engine (not shown) for creating the view database.

Similarly, the BL database generator 104 may receive a BL specification 109 for generating a BL component of the HMI application, and emulate the BL specification 109 into a BL database 110 by employing a BL database generation engine (not shown). As will be described in greater detail below, the generated BL database 110 may be implemented in a BL database schema The BL database generator 104 may receive the BL specification 109 from one or more input sources 111 and store the same in a memory (not shown). Further, the BL database generator 104 may store the generated BL database 110 in the memory (not shown). It should be noted that, in some embodiments, the original equipment manufacturer (OEM) may provide the BL specification to the BL database generator in a paper format. The BL database generator 104 may include a modeling tool 112 for modeling the BL specification to be implemented on the target platform 102.

The HSDP 101 may be communicatively coupled to the view database generator 103 and the BL database generator 104 via a communication channel 113. The HSDP 101 may further be communicatively coupled to the target platform 102 via the communication channel 113. The communication channel may be any wired or wireless communication network (e.g., local area network (LAN), wireless LAN (WLAN), wide area network (WAN), Internet, etc.) or a wired or wireless communication medium (e.g., serial port, universal serial bus (USB), Bluetooth, etc.). In some embodiments, the HSDP 101 may receive the view database 106 from the view database generator 103 and the BL database 110 from the BL database generator 104. The HSDP 101 may then deliver the HMI application to the target platform 102 by delivering the view database 106 and the BL database 110. Thus, the HSDP may act as a cloud service platform for delivering the HMI content to the target platform 102. The HSDP 101 may include a processor 114 and a memory 115 for implementing the HMI service 116 for delivering re-configurable HMI application to the target platform 102.

It should be noted that, in some embodiments, the view database 106 and the BL database 110 may be decoupled from each other, thereby enabling faster development, validation, and deployment of the HMI application. Further, the integration of the View database 106 and the BL database 110 in the target platform 102 may be implemented in a technology agnostic manner. Further, it should be noted that, in some embodiments, the view database generator 103 and the BL database generator 104 may be implemented within the HSDP 101. Thus, the HSDP 101 may generate the view database 106 (using the view database generation engine) and the BL database (using the BL database generation engine) from the view specification and the BL specification, respectively. In such embodiments, the system 100 may include the HSDP 101 and the target platform 102.

The target platform 102 may include a processor 117 and a memory 118 for receiving the re-configurable HMI application from the HSDP 101 over the communication network 113. The processor may further include a device under test (DUT) component 119. As will be described in greater detail in conjunction to FIG. 2, the DUT 119 may provide for a scalable architecture by way of loosely coupled view database and the BL database.

Figure 2:
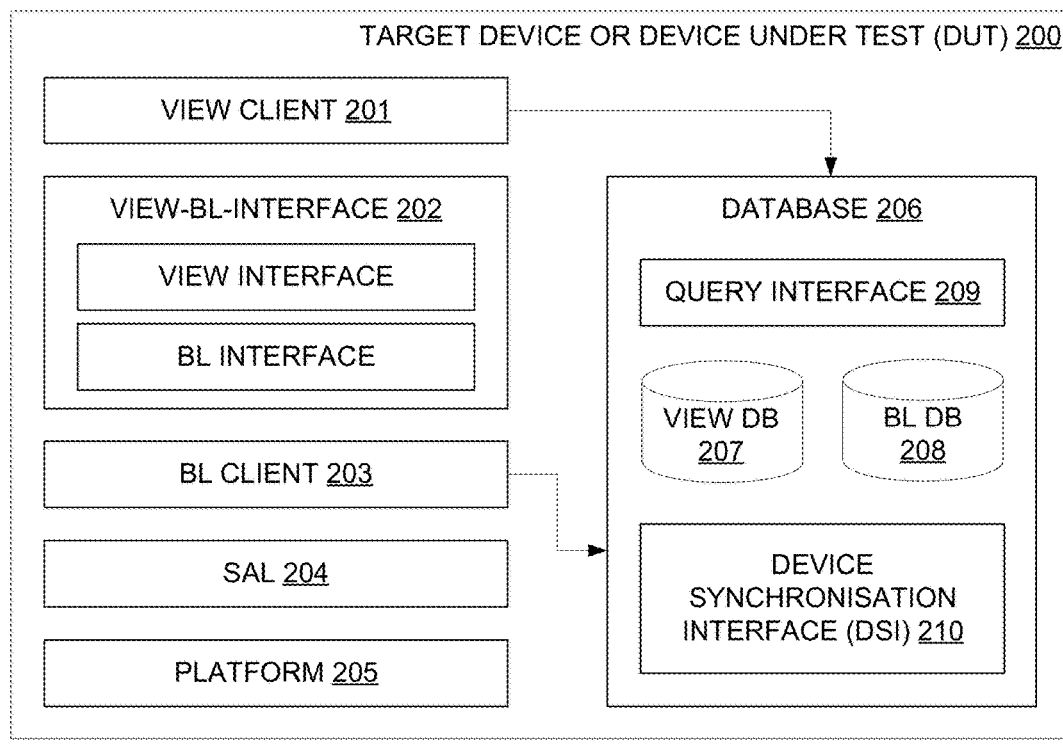
FIG. 2 is a functional block diagram of a target device, in accordance with some embodiments of the present disclosure.

Referring now to FIG. 2, a functional block diagram of an exemplary DUT 200, analogous to the DUT 119 of FIG. 1, is illustrated in accordance with some embodiments of the present disclosure. The DUT may also be referred to as target device or target platform and may be used interchangeably throughout the document. The DUT 200 may include a view component 201, a View-BL-Interface (VBI) 202, a BL component 203, a service access layer (SAL) 204, a platform 205, and a database 206. The view component 201 may be a thin client for visualizing the HMI application screen. The HMI application screen may include the VBI 202, the BL component 203, and the SAL 204. The BL 203 may further include the control logic for control and functioning of the HMI application. The interface between the view component and the BL component may be defined using an XML schema. Further, the VBI 202 may decouple the view component 201 from the BL component 203. The SAL 404 may be an interface that may decouple the BL component 203 from platform services. It should be noted that the SAL 204 may use an XML based schema to define the interface between the BL component and the platform services. The platform 205 may include platform specific services encapsulated in the platform layer. The database 206 may include the view database 207 and the BL database 208 installed on the DUT. The database 206 may further include a query interface 209 to execute the view component 201 and the BL component 203 queries against the respective vide database 207 and the BL database 208. Moreover, the database may include a device synchronization interface (DSI) 210 that may enable the target platform to synchronize the view database 207 and the BL database 208 with any updates that may be available from the HMI service of the HSDP 101. As will be described in greater detail below, every widget (part of the view component) may be associated with a data pool identification. The target platform may, therefore, implement and maintain a data pool, which may be updated with appropriate data (e.g. signal strength value, phone number etc.) so as to reflect the content change in the widgets.

Figure 3:
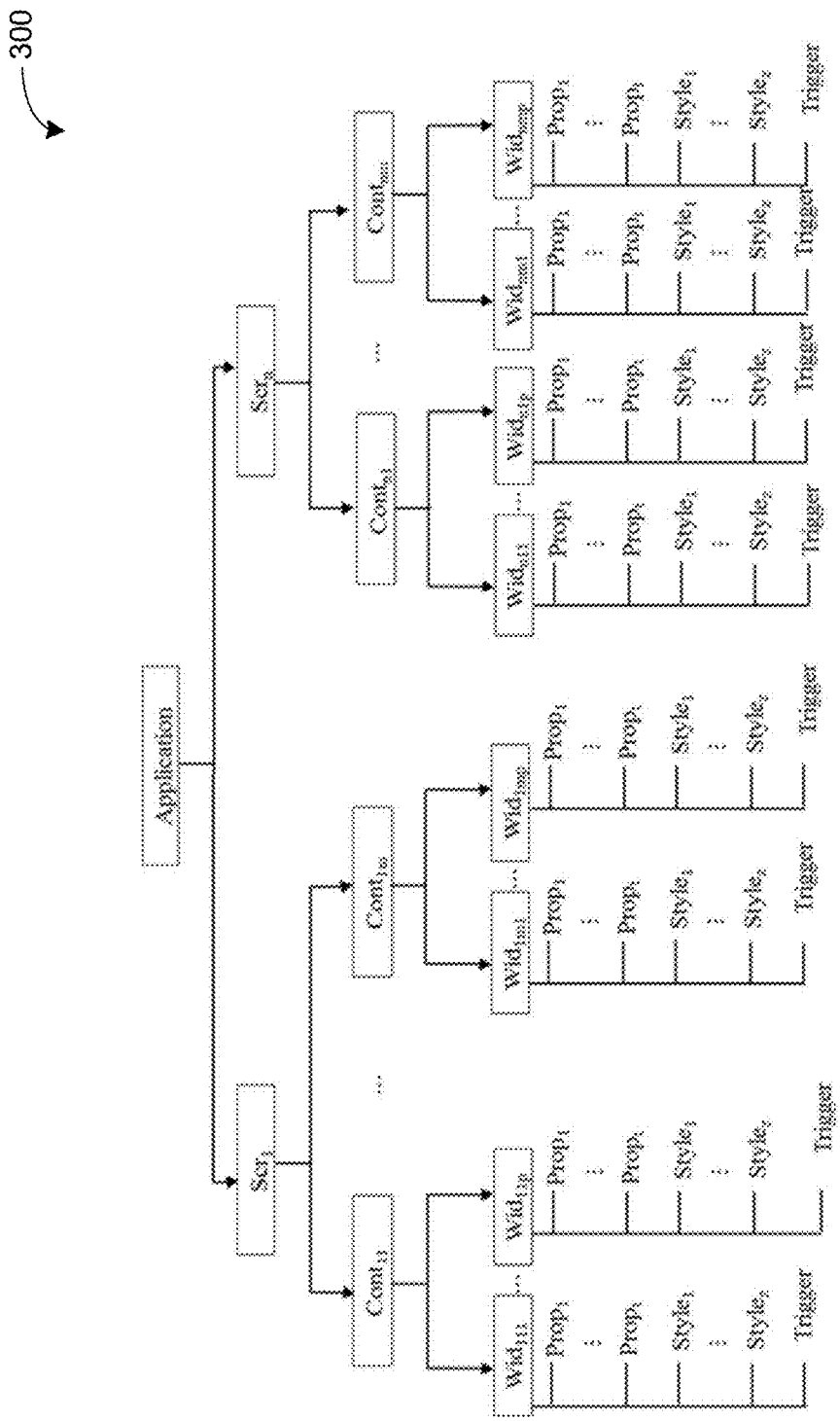
FIG. 3 is a schematic representation of an exemplary view information organization in the view database, in accordance with some embodiments of the present disclosure.

The view database may include a view information, an image Information, and a string Information. The view information may include information of all view elements of a HMI application. The image information may include a list of images used in the HMI application, while the string information may include a list of strings used in the HMI application. As will be appreciated, for each view, the image of the screen may be stored. Referring now to FIG. 3, a schematic representation of an exemplary view information organization 300 in the view database is illustrated, in accordance with some embodiments of the present disclosure. In particular, the view information 300 of a HMI application may include multiple screens (Scr), such as $Scr_1$, $Scr_2$, ... $Scr_i$ ($Scr_i$ representing the $i^{th}$ screen). Additionally, each of the screens may include multiple panels or containers (Cont), such as $Cont_{ij}$ ($Cont_{ij}$ representing the $j^{th}$ container of the $i^{th}$ screen). Further, each of the containers may include multiple widgets (Wid), such as $Wid_{ijk}$ ($Wid_{ijk}$ representing $k^{th}$ widget of $j^{th}$ container of $i^{th}$ screen). The widgets may include, but are not limited to, text box and button. It should be noted that each widget may have multiple properties (e.g., (x, y) coordinates, style attributes (e.g., font, color, bold, italics, etc), and so forth. Each widget may also be associated with a trigger that may be initiated for prompting and receiving user inputs in that widget. This trigger may then be passed to the BL component for further processing. Further, it should be noted that the container may include a child container. As stated above, the view database may provide for the query information interface to obtain details of any screen elements. The view component 201 may also use the query interface to obtain the information and render the screen.

Referring now to FIG. 4, a tabular representation of an exemplary BL database organization 400 is illustrated, in accordance with some embodiments of the present disclosure. The BL database 400 may include a set of states. Each of the states may further include various functions, such as 'Entry' function, 'Do' function, 'Exit' function, and 'Transition' function. The 'Entry' function may be executed during a transition from other state to a current state. The 'Do' function may be executed for doing any continuous processing that may be needed for the current state. The 'Exit' function may be executed during a transition to other state from the current state. Typically, while moving from 'state A' to 'state B', 'Exit' function of 'state A' and 'Entry' function of 'state B' may be called for performing finalization and initialization activities. The 'Do' function may be used for performing state specific processing. The 'Transition' function may include additional details for each of the triggers. For example, for each trigger, the 'Transition' function may include a 'Guard' condition, an 'Action' function, and a 'Next' state. The 'Guard' condition relate to a condition that may be evaluated before taking a particular action. The Action function may relate to a function that may be executed upon fulfillment of the 'Guard' condition. The 'Next' state may relate to a name of the next state upon completion of the 'Action' function.

It should be noted that the above discussed subsystems (HSDP platform 101, target platform 102, view database generator 103, BL database generator 104, DUT 119, 200, etc.) and their modules, circuitry, etc. may be implemented in programmable hardware devices such as programmable gate arrays, programmable array logic, programmable logic devices, and so forth. Alternatively, the subsystems, circuitry, and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

Figure 5:
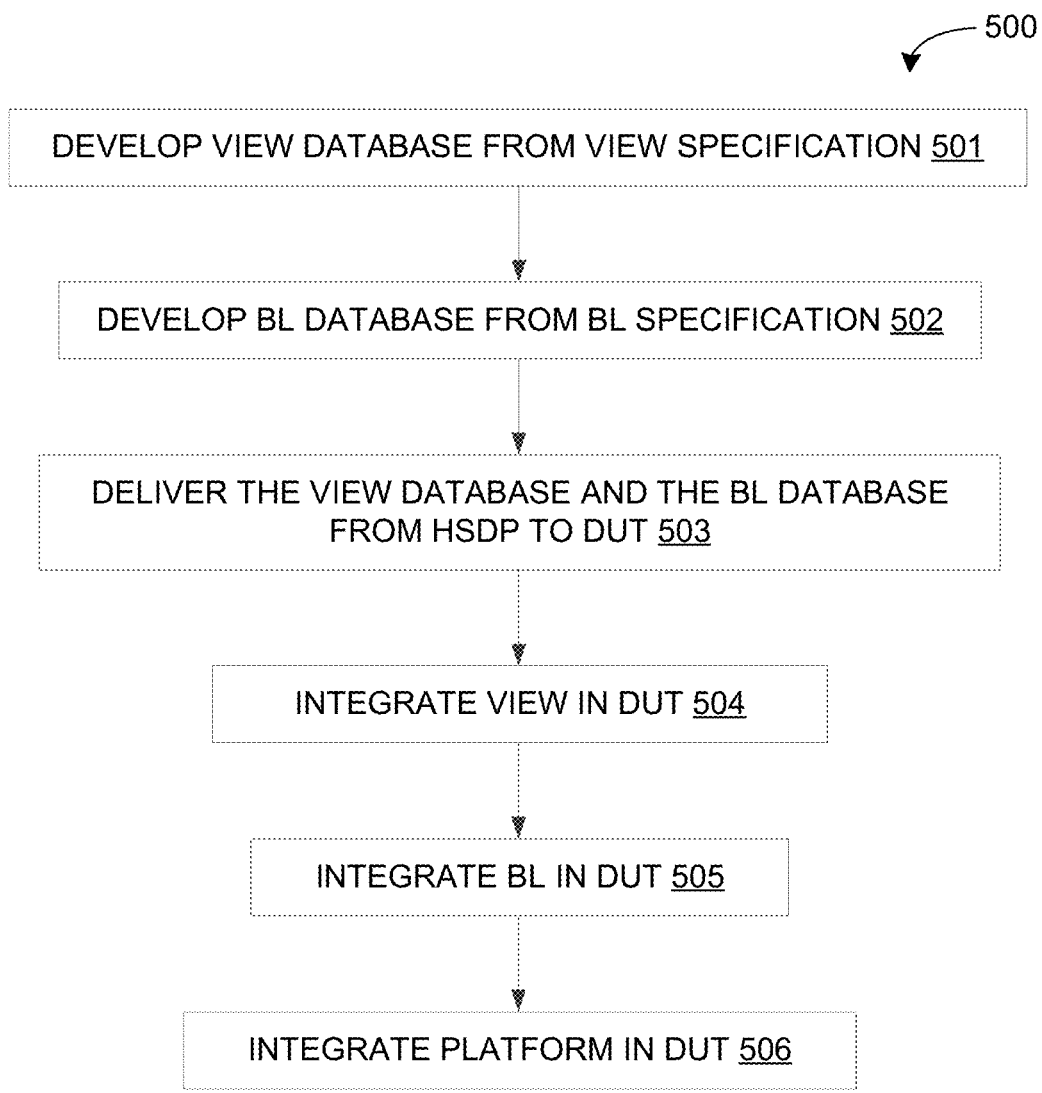
FIG. 5 is a flow diagram of an exemplary process overview for developing, delivering, and deploying a re-configurable HMI application, in accordance with some embodiments of the present disclosure.

Referring now to FIG. 5, an overview of an exemplary process 500 for developing, delivering, and deploying the re-configurable HMI application is depicted via a flowchart, in accordance with some embodiments of the present disclosure. The process 500 may involve the steps of developing the view database from the view specification at step 501, developing the BL database from the BL specification at step 502, delivering scene database and BL database from the HSDP to DUT at step 503, integrating view in DUT at step 504, integrate BL in DUT at step 505, and integrating platform in DUT at step 506.

Figure 6:
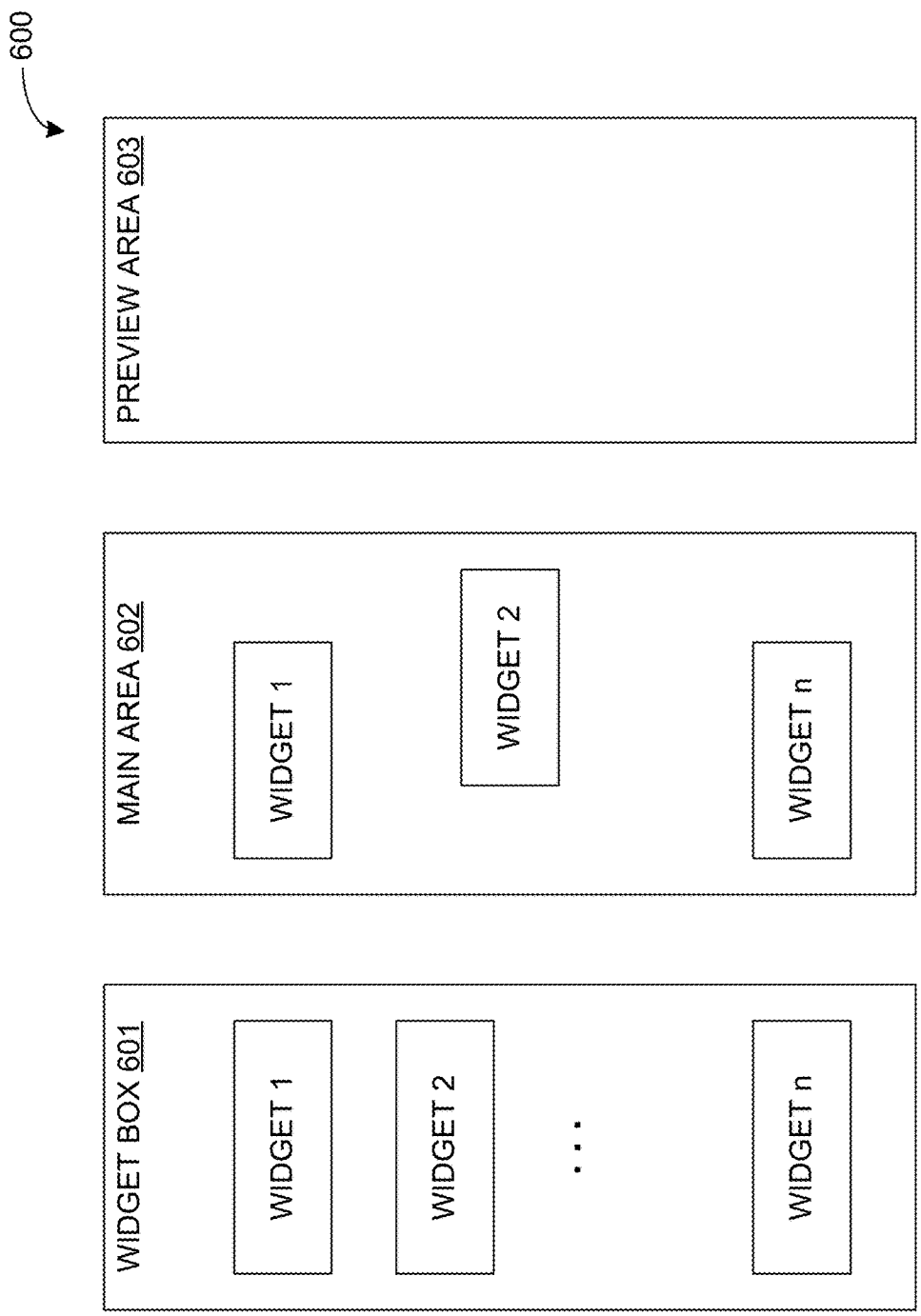
FIG. 6 is a block diagram of an exemplary integrated development environment (IDE) for building the view database, in accordance with some embodiments of the present disclosure.

At step 501, the view database may be developed from view specification by the view database generator. The HSDP may then receive the view database from the view database generator. Alternatively, in some embodiments, the HSPD itself may implement the view database generator to develop the view database from the view specification. Further, in some embodiments, the HSDP may develop the view database through an integrated development environment (IDE). Referring now to FIG. 6, a block diagram of an exemplary IDE 600 for building the view database is illustrated, in accordance with some embodiments of the present disclosure. The IDE 600 may provide a widget box 601 that includes a number of different widgets (e.g., widget 1, widget 2, . . . widget n). The IDE 600 may further provide a drag-and-drop capability that may allow the user to drag and drop one or more widgets from the widget box 601 to a main area 602 for creating a view of the HMI application. Additionally, the IDE 600 may provide a preview area 603 for facilitating a view preview before submitting the finalized view specification to the view database generator for developing the view database. In some embodiments, a 'WYSIWYG" IDE tool may provide an IDE for development of the view database. However, it should be noted that the scope of the invention may not be restricted to a particular IDE tool or an IDE tool, and any other automation tool may also be employed for generating the view database from the view specification. Further, the IDE tool may provide various functionalities, such as creating a new view, creating an application project having all views, submit the view in the view database, and a property window for changing the widget's properties, style attributes, or the like.

Figure 7:
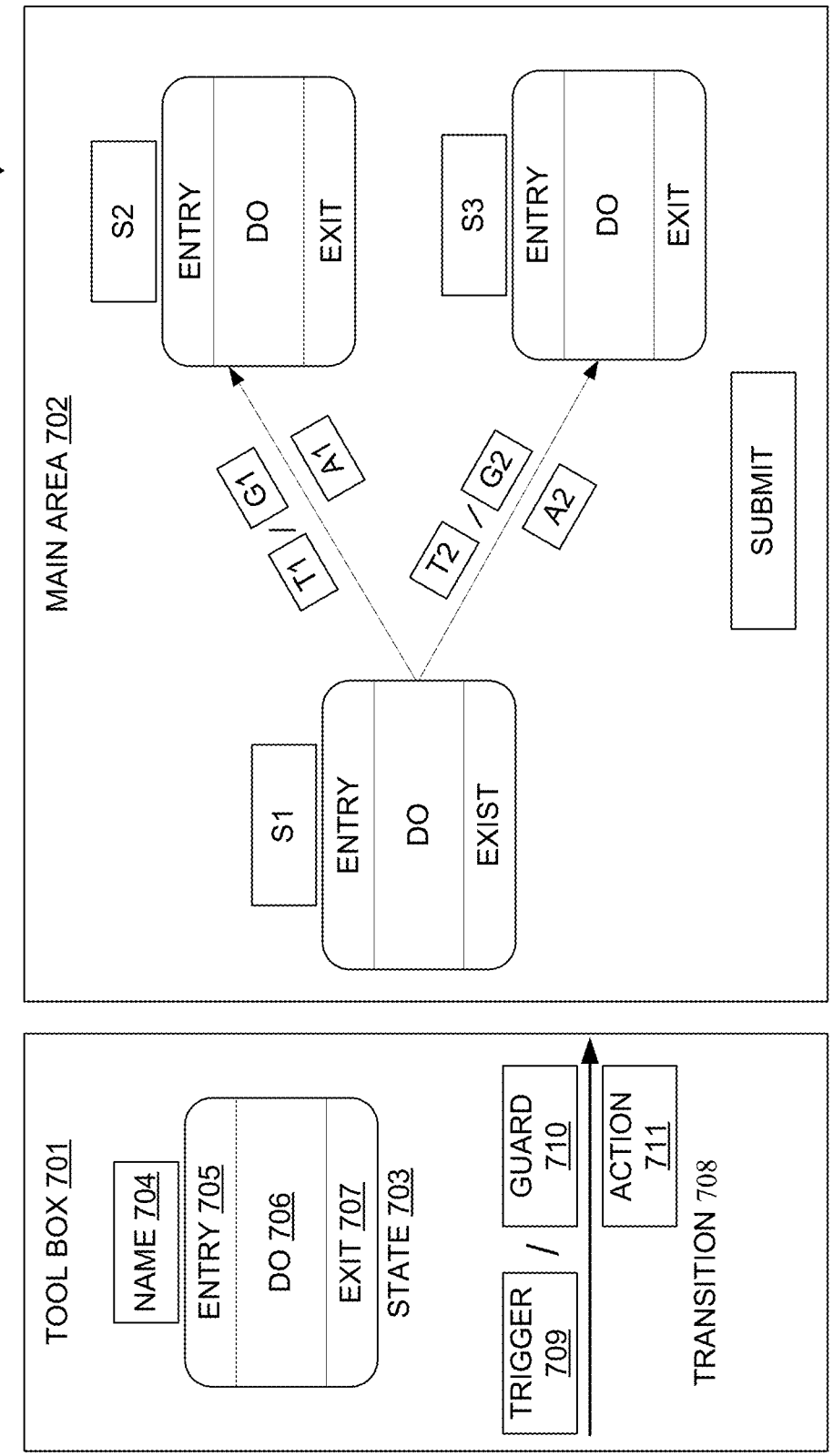
FIG. 7 is a block diagram of exemplary editor for building the BL database, in accordance with some embodiments of the present disclosure.

Referring back to FIG. 5, at step 502, the BL database may be developed from BL specification by the BL database generator. The HSDP may then receive the BL database from the BL database generator. Alternatively, in some embodiments, the HSPD itself may implement the BL database generator to develop the BL database from the BL specification. Further, in some embodiments, the HSDP may develop the BL database through an editor. Referring now to FIG. 7, a block diagram of an exemplary editor 700 for building the BL database is illustrated, in accordance with some embodiments of the present disclosure. The editor 700 may provide a drag-and-drop capability that may enable creation of state and transition. For example, the state and transition may be dragged and dropped from a tool box 701 to a main area 702 as per the BL specification. The BL database may be generated upon clicking a submit button in the main area 702.

Each of the states 703 may be identified by a state name 704 and may include various functions including, but not limited to, an 'Entry' function 705, a 'Do' function 706, and an 'Exit' function 707. The 'Entry' function may execute when there is an entry into a state from another state. The function may be selected through a function selection window in the editor 700. The function selection window may show a built-in functions and custom functions. The built-in or custom functions may be entered in an interface definition file (IDF) of the editor 700. The function parameters may be provided in a suitable format. An exemplary format for providing the function parameters may be as below:

<param1 name>:<param1 value>; <param2 name>:<param2 value>; . . . <paramN name>:<paramN value>.

In some embodiments, if a screen is associated with a state, then screen drawing may be implemented in the 'Entry' function using show_screen( ) function with screen_id:XXX as a parameter. Additionally, the 'Do' function may execute when there is a continuous processing that may be required within a state. The 'Do' function may be similarly selected through the function selection window in the editor. Further, the 'Exit' function may execute when there is an exit from a state to another state. Again, the 'Exit' function may be selected through the function selection window.

Further, each of the transitions 708 may include a trigger 709, a guard function 710, and an action function 711. The trigger 709 may be selected from a trigger selection window based on a user initiated trigger or system initiated trigger. The trigger selection window may include a list of triggers as entered in the IDF of the editor 700. The transition 708 may be activated when a trigger occurs in run-time. The guard function 710 and the action function 711 may be selected from the function selection window. The action may be executed by execution of the action function 711 based on result of execution of the guard function 710. For example, if the guard function 710 is successful (i.e., a condition is met), the action may be executed. Further, the action may be followed by a state transition. Thus, the action function 711 is executed if the guard function 710 is successful. However, if the guard function 710 is not successful, the guard function 710 may remain in the same state. Further, if any component of the screen is required to be updated on a trigger, then the same may be achieved by employing update_component ( ) function with screen_id:XXX, container_id:YYY, and widget id:ZZZ as parameters.

Figure 8:
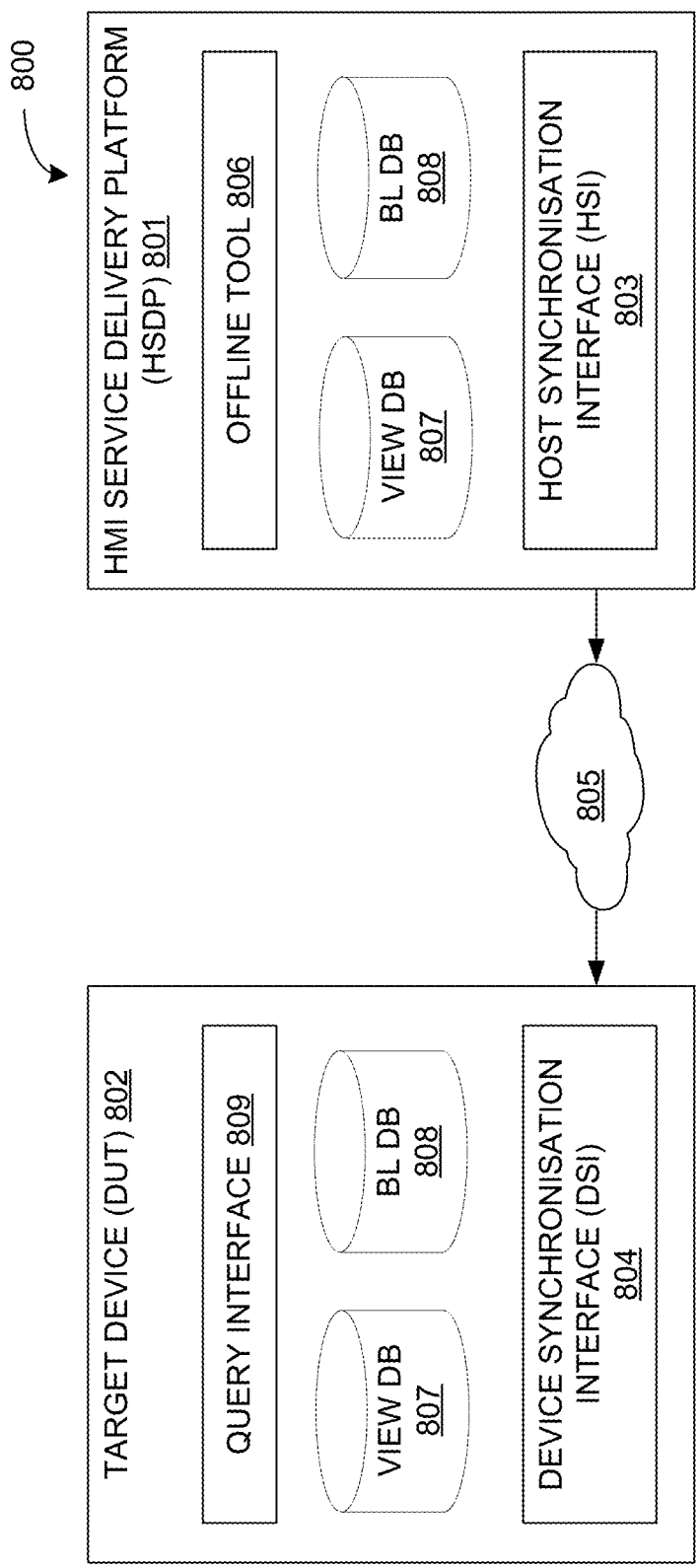
FIG. 8 is a schematic representation of delivering the view database and the BL database from the HSDP to the target platform, in accordance with some embodiments of the present disclosure.

Referring back to FIG. 5, at step 503, the HSDP may deliver the view database and the BL database developed in steps 501 and 502 to the target platform of the DUT. Referring now to FIG. 8, a schematic representation of delivering the view database and the BL database from the HSDP 801 to the target platform on the target device 802 is illustrated, in accordance with some embodiments of the present disclosure. The view database and the BL database may be delivered from the HSDP 801 to the target device 802 by establishing a communication between a host synchronization interface (HSI) 803 and a device synchronization interface (DSI) 804 over a communication network 805. As discussed above, the HSDP 801 may receive or otherwise develop, using various tools 806, the view database 807 and the BL database 808. The HSDP 801 may then deliver the view database 807 and the BL database 808 using a cloud framework by utilizing various communication protocols. For example, in some embodiments, the HSDP 801 may utilize open mobile alliance-data synchronization (OMA-DS) protocol to deliver the view database 807 and the BL database 808.

The HSDP 801 may include the HSI 803 and other components to develop content of the view database 807 and the BL database 808. As will be appreciated, in some embodiments, the HSDP 801 may be maintained by the OEM so as to deliver the HMI content multiple target devices periodically. The HSI 803 may further deliver the HMI content to the target platform (DUT) 802. The target platform 802 may include the DSI 804 to check if a version of the view database 807 and the BL database 808 residing at the target platform 802 is same as that of HSDP 801. If there is a mismatch in the two versions, the view database 807 and the BL database 808 may be synchronized as per the specific requirements of the target platform. For example, if format of the view database 807 or the BL database 808 are not compact and compatible, then a target platform specific format conversion may be performed at the HSDP 801.

Figure 9:
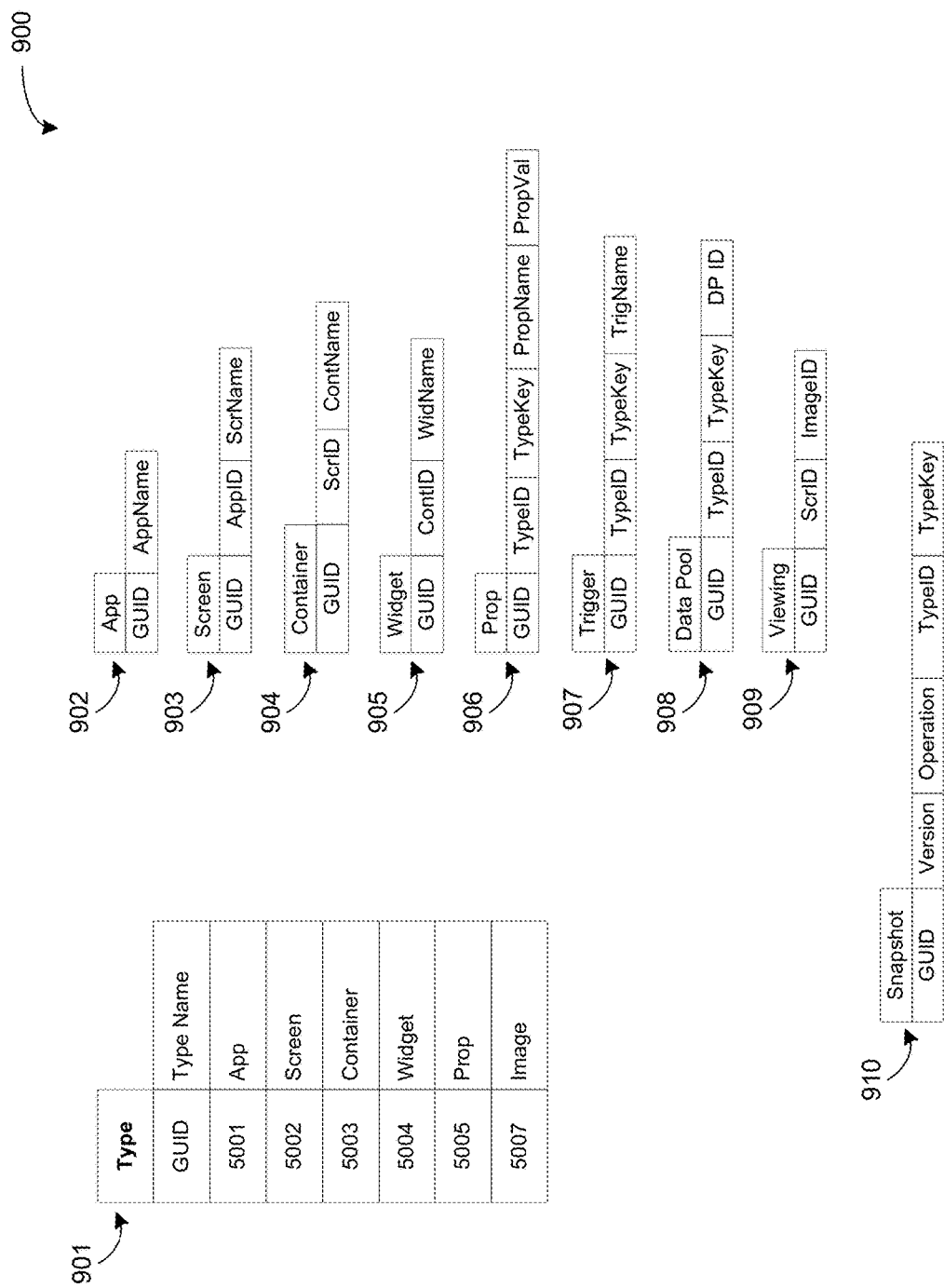
FIG. 9 is an exemplary database schema of the view database, in accordance with some embodiments of the present disclosure.

As discussed above, the view database may be implemented in a view database schema. In some embodiments, the view database schema may define and store various features including, but not limited to, an application, a screen, a container, a widget, one or more properties, and an image. Referring now to FIG. 9, an exemplary database schema 900 of the view database is illustrated, in accordance with some embodiments of the present disclosure. The view database schema 900 may include various tables including, but not limited to, a type table 901, an application table 902, a screen table 903, a container table 904, a widget table 905, a property table 906, a trigger table 907, a data pool table 908, and a view image table 909. The type table 901 may include different types of user interface (UI) elements along with their globally unique identifiers (GUID's). The application table 902 may include a list of applications along with their GUID's. The screen table 903 may include a list of screens for a given application along with their GUID's. The container table 904 may include a list of containers for a given screen along with their GUID's. The widget table 905 may include a list of widgets for a given container along with their GUID's. The property table 906 may include a list of properties, for a given screen, a given container, or a given widget as mentioned in a TypeID field, along with their GUID's and property values. Thus, the TypeID field may define the type UI elements. Further, the TypeKey may provide the GUID's for that particular type table (e.g., screen, container, or widget). The trigger table 907 may include a list of triggers for a given container or a given widget along with their GUID's. For example, click event of a button may have a trigger ID. The trigger IDs may be used by BL for processing the user initiated event. The data pool table 908 may include a list of data pool identifications for a given container or a given widget along with their GUID's. The view image table 909 may store view images for a given screen along with their GUID's.

As will be appreciated, whenever any update is to be performed on an existing screen, the appropriate tables need be updated. Referring back to FIG. 8, in some embodiments, the appropriate table may be updated using QueryInfo interface 809 of the view database. The update may include various operations including, but not limited to, an insert, an update or a modification, and a delete. Additionally, a snapshot view may be created based on a snapshot view table. The snapshot view table may provide a difference between the two versions of the view database. Referring again to FIG. 9, the snapshot view table 910 of the view database is illustrated in accordance with some embodiments of the present disclosure. The snapshot view table 910 may include a list of operations to be performed, for a given TypeKey in a given UI element as mentioned in a TypeID field, along with their GUID's and versions of the HMI application. Thus, the TypeID and TypeKey may determine a record and a data element that needs to be updated in the database. Further, the operation filed may indicate the database operation (e.g., insert, modify, delete, etc.) that needs to performed while updating the record and the data element.

Figure 10:
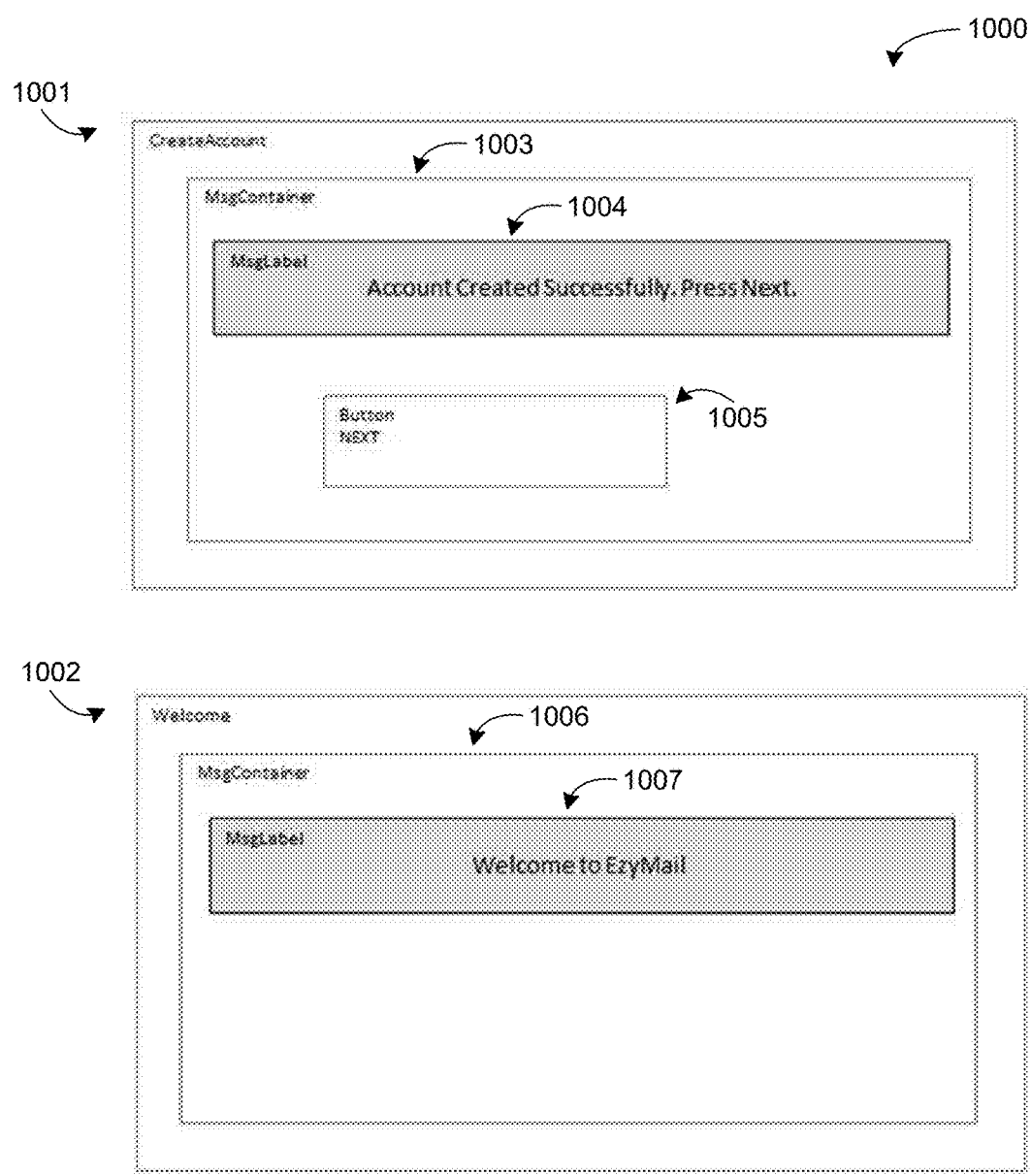
FIG. 10 illustrates an exemplary user interface of an exemplary HMI application, in accordance with some embodiments of the present disclosure.

Referring now to FIG. 10, an exemplary user interface 1000 of an exemplary HMI application is illustrated, in accordance with some embodiments of the present disclosure. As illustrated, the user interface 1000 of the 'EzyMail' application may include a 'Create Account' screen 1001 and a 'Welcome' screen 1002. The 'Create Account' screen 1001 may include a message container 1003, which in turn may include widgets—a message label 1004 and a 'next' button 1005. Upon clicking the 'next' button 1003 (i.e., trigger) on the create account screen 1001, the user may be presented with the 'Welcome' screen 1002. The 'Welcome' screen 1002 may also include a message container 1006, which in turn may include widget—a message label 1007.

Figure 11:
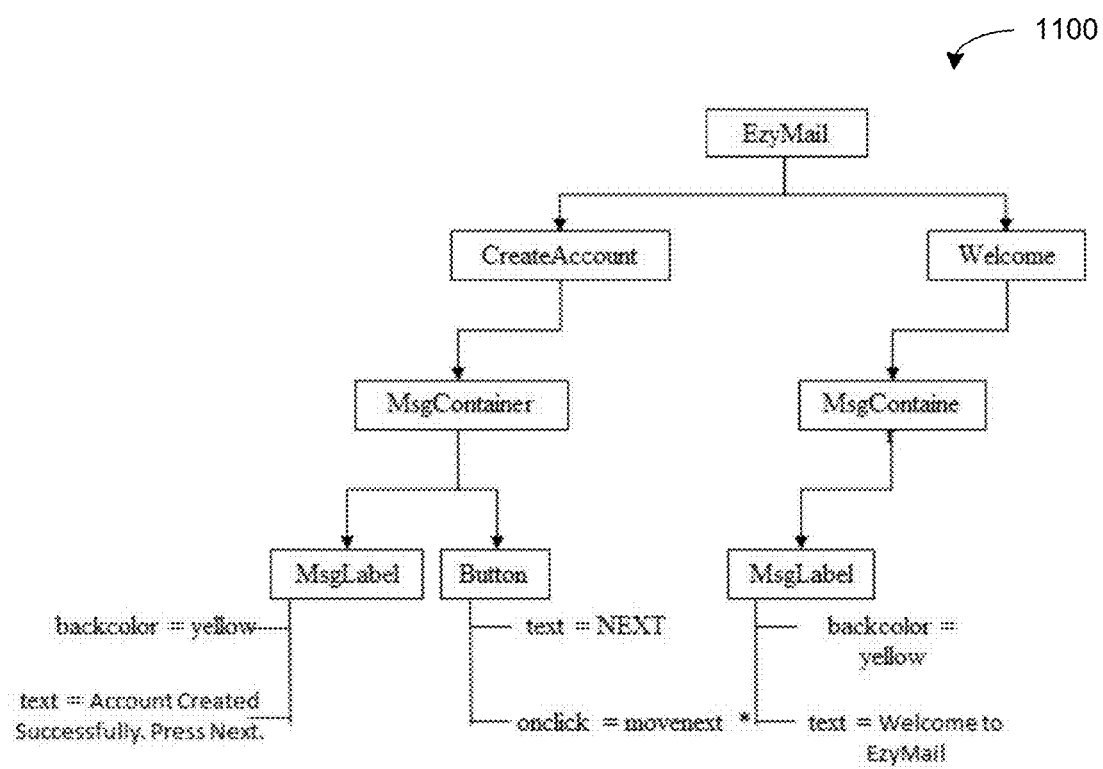
FIG. 11 is a schematic representation of view information organization of the exemplary user interface of FIG. 10, in accordance with some embodiments of the present disclosure.

Referring now to FIG. 11, a schematic representation of view information organization 1100 of the exemplary user interface 1000 is illustrated, in accordance with some embodiments of the present disclosure. As will be appreciated, the view information organization 1100 for the view database of the 'EzyMail' application is similar to the view information organization described above in conjunction to FIG. 3. As illustrated, the widget-message label of the 'Create Account' screen may have properties, such as, yellow background color and 'Account Created Successfully. Press Next' as text. Further, the widget-button of the 'Create Account' screen may have properties, such as, 'Next' as text and 'movenext' as on click trigger. Further, as illustrated, the widget-message label of the 'Welcome' screen may have properties, such as, yellow background color and 'Welcome to EzyMail' as text.

Figure 12:
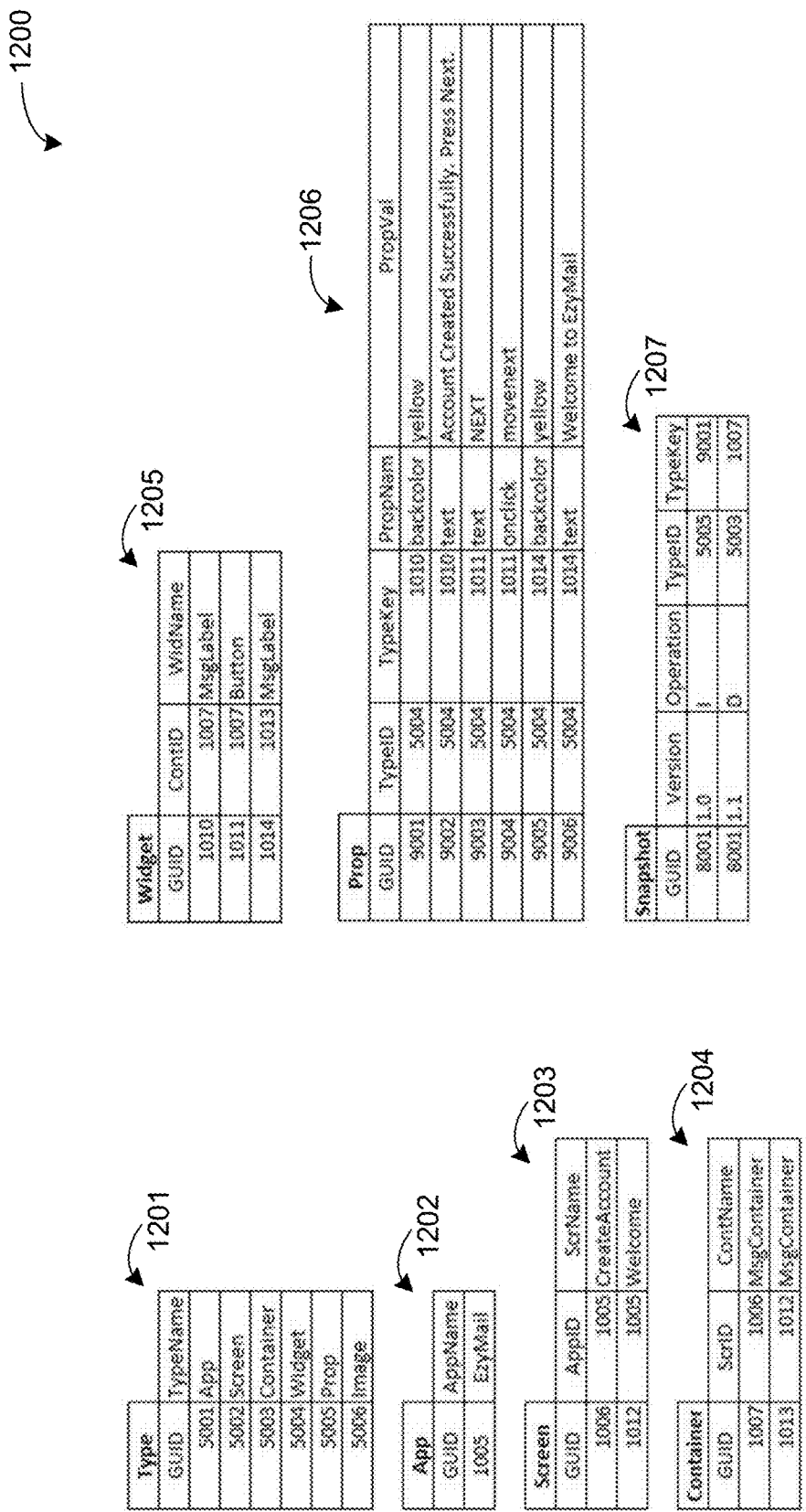
FIG. 12 is a view database schema of the exemplary user interface of FIG. 10, in accordance with some embodiments of the present disclosure.

Referring now to FIG. 12, a view database schema of the exemplary user interface 1000 is illustrated, in accordance with some embodiments of the present disclosure. The view database schema of the 'EzyMail' application may include, but is not limited to, a type table 1201, an application table 1202, a screen table 1203, a container table 1204, a widget table 1205, and a property table 1206 along with their respective and exemplary entries. Additionally, an exemplary snapshot view table 1207 of the view database of the EzyMail application is shown. As discussed above, the snapshot view table 1207 may be created based on a comparison of view database schema of the current version of the 'EzyMail' application and a previous version of the 'EzyMail' application.

Figure 13:
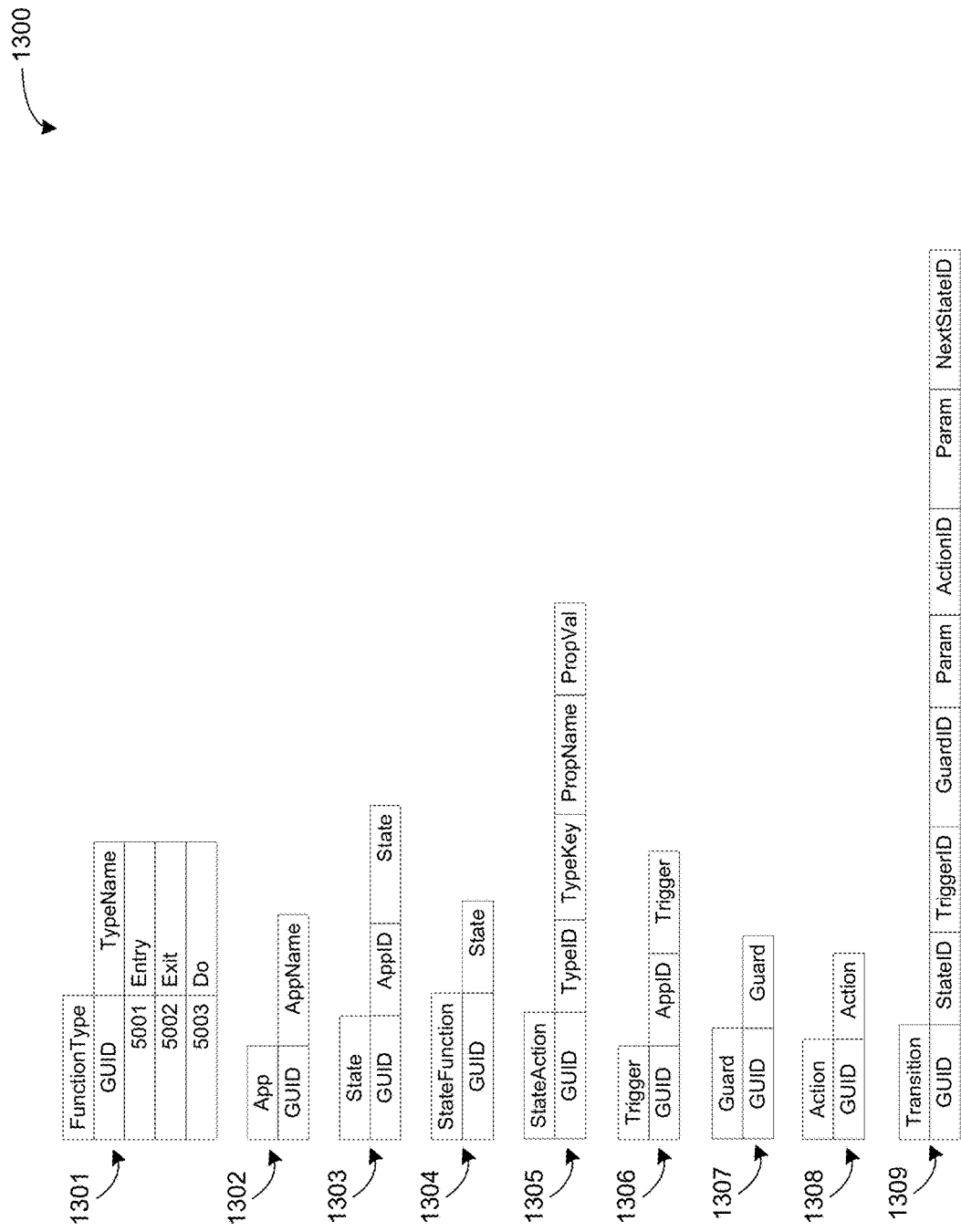
FIG. 13 is an exemplary database schema for the BL database, in accordance with some embodiments of the present disclosure.

Further, as discussed above, the BL database may be implemented in a BL database schema. In some embodiments, the BL database schema may define and store various features including, but not limited to, a function, an application, a state, a state function, a state action, a trigger, an action function, a condition for action, a guard function, and a transition. Referring now to FIG. 13, an exemplary database schema 1300 of the BL database is illustrated, in accordance with some embodiments of the present disclosure. The BL database schema 1300 may include various tables including, but not limited to, a function type table 1301, an application table 1302, a state table 1303, a state function table 1304, a state action table 1305, a trigger table 1306, a guard function table 1307, an action table 1308, and a transition table 1309. The function type table 1301 may include the type of functions of each state included in the BL specification along with their GUID's. The application table 1302 may include a list of applications along with their GUID's. The state table 1303 may include a list of states for a given application along with their GUID's. The state function table 1304 may include a list of 'Entry', 'Do', and 'Exit' functions for each state along with their GUID's. The state function table is a master table which lists all the possible functions for that particular state. The state action table 1305 may include list of 'Entry', 'Do', and 'Exit' functions for a given state. It should be noted that the state action table may map any function from state function table with 'Entry', 'Do', or 'Exit' function. It is possible that, for multiple states, same function may be used for 'Entry', 'Do', or 'Exit' purpose. Thus, the state action table 1305 may help in avoiding duplication. The trigger table 1306 may include a list of states for a given application along with their GUID's. The guard function table 1307 may include a list of guard functions along with their GUID's. The action table 1308 may include a list of action functions. The transition table 1309 may include a list of transitions. Further, as will be appreciated, a snapshot view may be created based on a snapshot view table, which may provide a difference between the two versions of the view database.

Figure 14:
FIG. 14 is a schematic of delivering an update on a HMI application by synchronizing database between the HSDP and the target platform using Open Mobile Alliance-Data Synchronization (OMA-DS) protocol, in accordance with some embodiments of the present disclosure.
Figure 15:
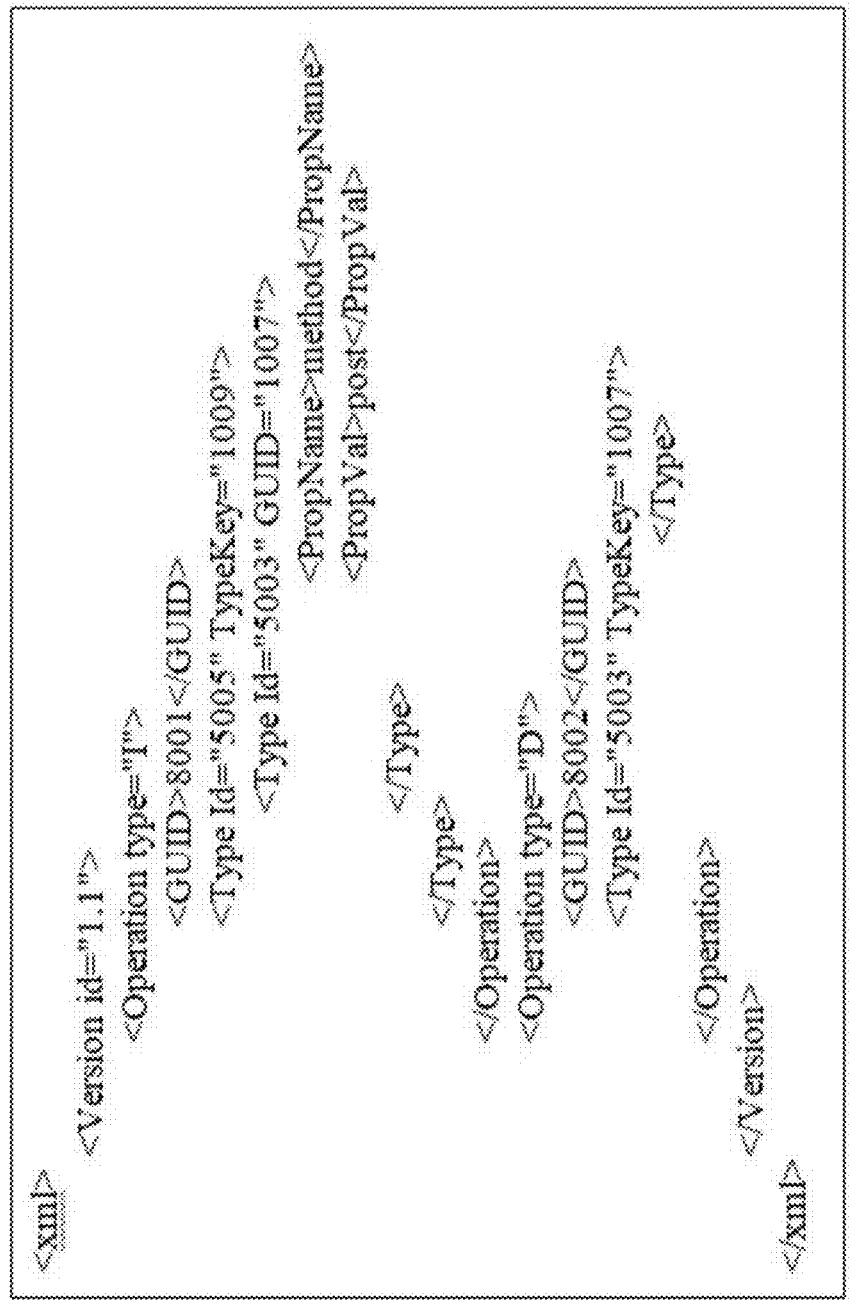
FIG. 15 is an exemplary query to the snapshot view table for preparation of data update package, in accordance with some embodiments of the present disclosure.

Referring now to FIG. 14, a schematic of delivering an update on a HMI application by synchronizing database between the HSDP 1406 and the target platform 1407 using Open Mobile Alliance-Data Synchronization (OMA-DS) protocol 1400 is illustrated, in accordance with some embodiments of the present disclosure. In particular, a communication flow for synchronizing database between the HSDP 1406 and the target device 1407 using OMA DS protocol, is illustrated, so as to deliver an update on the HMI application. At step 1401 of the communication flow, the target device 1407 may send a package Pkg#1 to the HSDP 1406. The package Pkg#1 may include information about the device capability, and authentication information for a client initialization. The device capability may further include a version number of the HMI application installed on the target device 1407. At step 1402, the HSDP 1406 may send a package Pkg#2 to the target device 1407. The package Pkg#2 may include a current version number of the HMI application available with the HSDP 1406, and authentication information for a server initialization. The version numbers may be compared at the HSDP 1406. In some embodiments, the version numbers may also be compared at the target device 1407. Further, at step 1403, based on the comparison, if there is a version mismatch, the HSDP 1406 may send a package Pkg#3 to the target device 1407. The package Pkg#3 may include a synchronization command (e.g., insert, modify, delete, etc.) and a synchronization content (if any). For example, the package Pkg#3 may include data identifications and contents associated with the commands 'insert' or 'modify'. As will be appreciated, there may be no synchronization content associated with the command 'delete'. As discussed above, the HSDP 1406 may read the database, compare the two versions of the database, and create a snapshot view table based on the differences identified during comparison. The HSDP 1406 may then query a snapshot view table so as to prepare package Pkg#3. Referring to FIG. 15, an exemplary query to the snapshot view table for preparation of data update package (i.e., package Pkg#3) is illustrated, in accordance with some embodiments of the present disclosure.

Referring back to FIG. 14, upon receiving the package Pkg#3 from the HSDP 1406, the target device 1407 may update (i.e., insert, modify, or delete) the corresponding database installed on the target device 1407. It should be noted that, in some embodiments, the target device 1407 may maintain its own locally unique identifier (LUID) for data identifications. If the target device maintains its own LUID, then the target device 1407 may maintain a mapping between the LUID and a GUID in a mapping table. Accordingly, at step 1404, the target device 1407 may send the mapping table to the HSDP 1406 using a package Pkg#4. At step 1405, the HSDP 1406 may send a mapping status to the target device 1407 after the HSDP may modify the mapping table. Thereafter, the steps 1403 through 1405 may be repeated until the HSDP database version may match with the target device database version.

Figure 16:
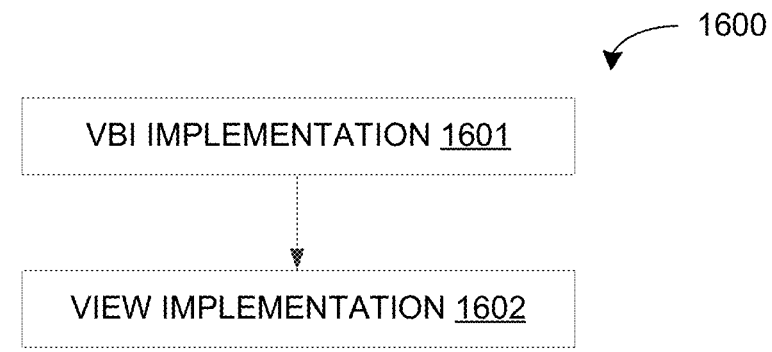
FIG. 16 is a flow diagram of an exemplary process for integrating the view database on the target platform, in accordance with some embodiments of the present disclosure.

Referring back to FIG. 5, at step 504, the view database or the updated view database may be integrated in the target device. Referring now to FIG. 16, an exemplary process 1600 for integrating the view database on the target platform is depicted via a flowchart, in accordance with some embodiments of the present disclosure. The process 1600 may include the steps of performing a VBI implementation at step 1601, and performing a view implementation at step 1602. At step 1601, the VBI may be implemented according to the VBI interface designed in an interface design. Further, a platform specific inter-process-communication (IPC) interface may be employed to inform the BL about a user input received. The BL may then update view about drawing a new screen or updating a component using the IPC interface provided by the view. Further, the BL may employ one or more of screen identification (ScrID), container identification (ContID), or widget identification (WidgetID) as mentioned in the screen table, the container table, or the widget table respectively for informing the view about the view action requested. At step 1602, the view may be implemented as per the view database delivered based on the view command received.

Figure 17:
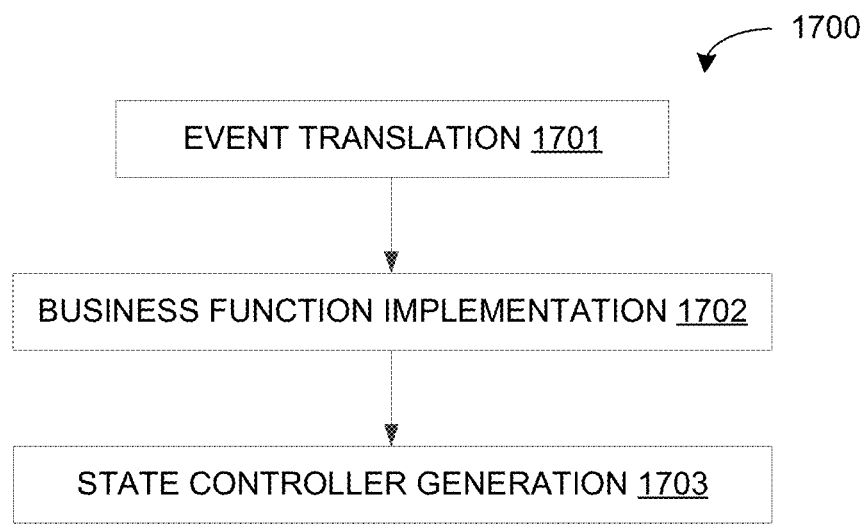
FIG. 17 is a flow diagram of an exemplary process for integrating the BL database on the target platform, in accordance with some embodiments of the present disclosure.

Referring back to FIG. 5, at step 505, the BL database or the updated BL database may be integrated in the target device. Referring now to FIG. 17, an exemplary process 1700 for integrating the BL database on the target platform is depicted via a flowchart, in accordance with some embodiments of the present disclosure. The process 1700 may include the steps of performing event translation at step 1701, performing business function implementation at step 1702, and performing state controller generation at step 1703. At step 1701, event translation may be performed by mapping the events to trigger and drive the multi-domain state machine. It should be noted that events may be of two types, namely user initiated events and system initiated events. The user initiated events may be received via the VBI interface, while the system initiated events may be received via the SAL interface. Both the events may be mapped to trigger and drive the multi-domain state machine. At step 1702, business function implementation may be performed using the platform interface. As discussed above, the business functions, that may be implemented, may include a guard function, an action function, and a state function. Each of the guard functions and each of the action functions may be implemented using the platform interface. Further, the state function may be any state specific business function that may be implemented for 'Entry', 'Do', or 'Exit' function. Further, an interface definition language (IDL) file may be created for each of the above functions to decouple state machine from multi-domain state controller. It should be noted that the implementation may differ for different product variants. At step 1703, a state controller may be generated. For each event, a business logic processing may be performed as per the BL database.

Referring back to FIG. 5, at step 506, the platform interface may be integrated in the target device. Based on the SAL interface, the action and guard conditions may be implemented. It should be noted that the action and guard conditions may be implemented using middleware services provided by the target platform. The SAL layer may register callback for any platform specific system event. On reception of such system event, the SAL may then generate the trigger. Further, for example, for a MICROSOFT WINDOWS enabled computing system, a reference platform implementation may be achieved so that the WINDOWS computing system simulation may be performed by a test team as per the need.

As will be appreciated by one skilled in the art, a variety of processes may be employed for developing and delivering the re-configurable HMI application from the HSDP on the target platform. For example, the exemplary system 100 may provide for development and delivery of the re-configurable HMI application by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 18:
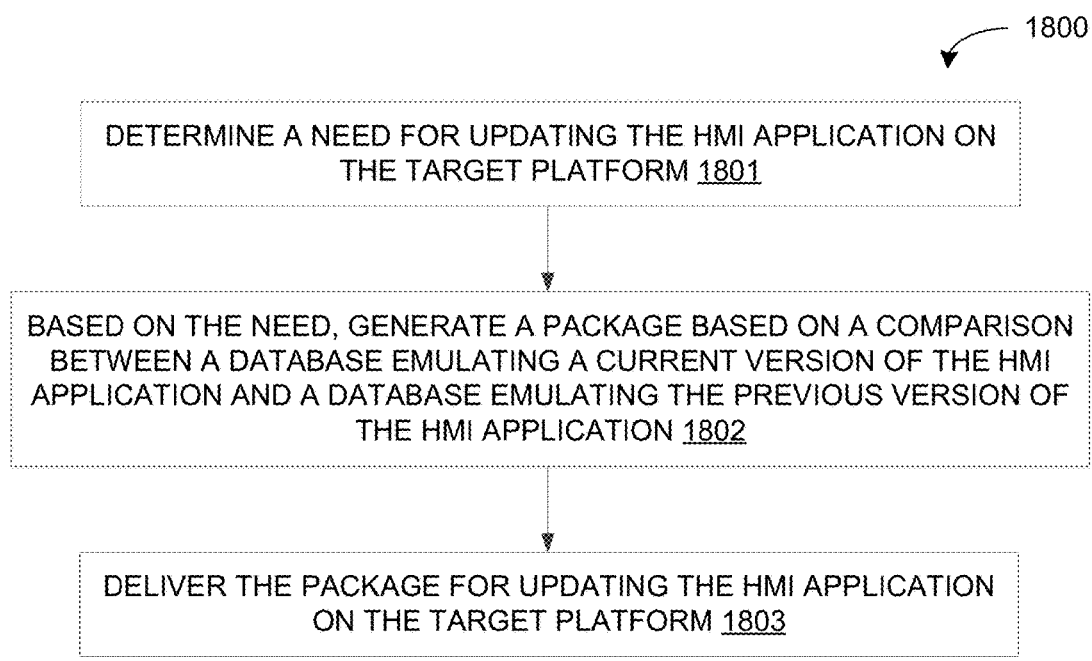
FIG. 18 is a flow diagram of an exemplary process for delivering an update on the HMI application from the HSDP to the target platform, in accordance with some embodiments of the present disclosure.

For example, referring now to FIG. 18, exemplary control logic 1800 for delivering an update on the HMI application from the HSDP to the target platform in a system, such as the system 100, is depicted via a flowchart in accordance with some embodiments of the present disclosure. As illustrated in the flowchart, the control logic 1800 may include the step of determining a need for updating the HMI application on the target platform at step 1801. The target platform may implement a previous version of the HMI application. Based on the determined need, the control logic 1800 may further include the step of generating a package based on a comparison between a database emulating a current version of the HMI application and a database emulating the previous version of the HMI application at step 1802. The database may be implemented in a database schema. The control logic 1800 may further include the step of delivering the package for updating the HMI application on the target platform at step 1803. It should be noted that, in some embodiments, the HSDP may deliver the package to the target platform using an Open Mobile Alliance-Data Synchronization (OMA-DS) protocol. Further, it should be noted that, in some embodiments, the package may be used to update the database on the target platform.

In some embodiments, determining the need at step 1801 may further include the steps of establishing a communication between the HSDP and the target platform, and determining a version mismatch by comparing a version number of the current version of the HMI application available with the HSDP and a version number the previous version of the HMI application implemented on the target platform.

Additionally, in some embodiments, the database may include a view database and a BL database with respect to a version of the HMI application. The view database may be generated based on a view specification of the HMI application, while the BL database may be generated based on a BL specification of the HMI application. As will be appreciated, the view database and the BL database may be decoupled from each other. In some embodiments, the control logic 1800 may include the step of receiving the view database and the BL database from respective sources. It should be noted that, in some embodiments, the database schema of the view database may define at least one of an application, an interface, a container, a widget, a property, or an image. Further, it should be noted that, in some embodiments, the database schema of the BL database may define at least one of a function, an application, a state, a state function, a state action, a trigger, an action function, a guard function, or a transition.

Moreover, in some embodiments, generating the package at step 1802 may include the step of querying a snapshot view table of the database. The snapshot view table may be created based on a difference between a database schema of the current version of the HMI application and a database schema of the previous version of the HMI application. It should be noted that, in some embodiments, the snapshot view table may include a GUID field, a version field, an operation field, a TypeD field, and a TypeKey field. Further, in some embodiments, the package may include, based on the query, a synchronization command and a content associated with the synchronization command. The synchronization command may include at least one of an insert, a modify, or a delete.

Figure 19:
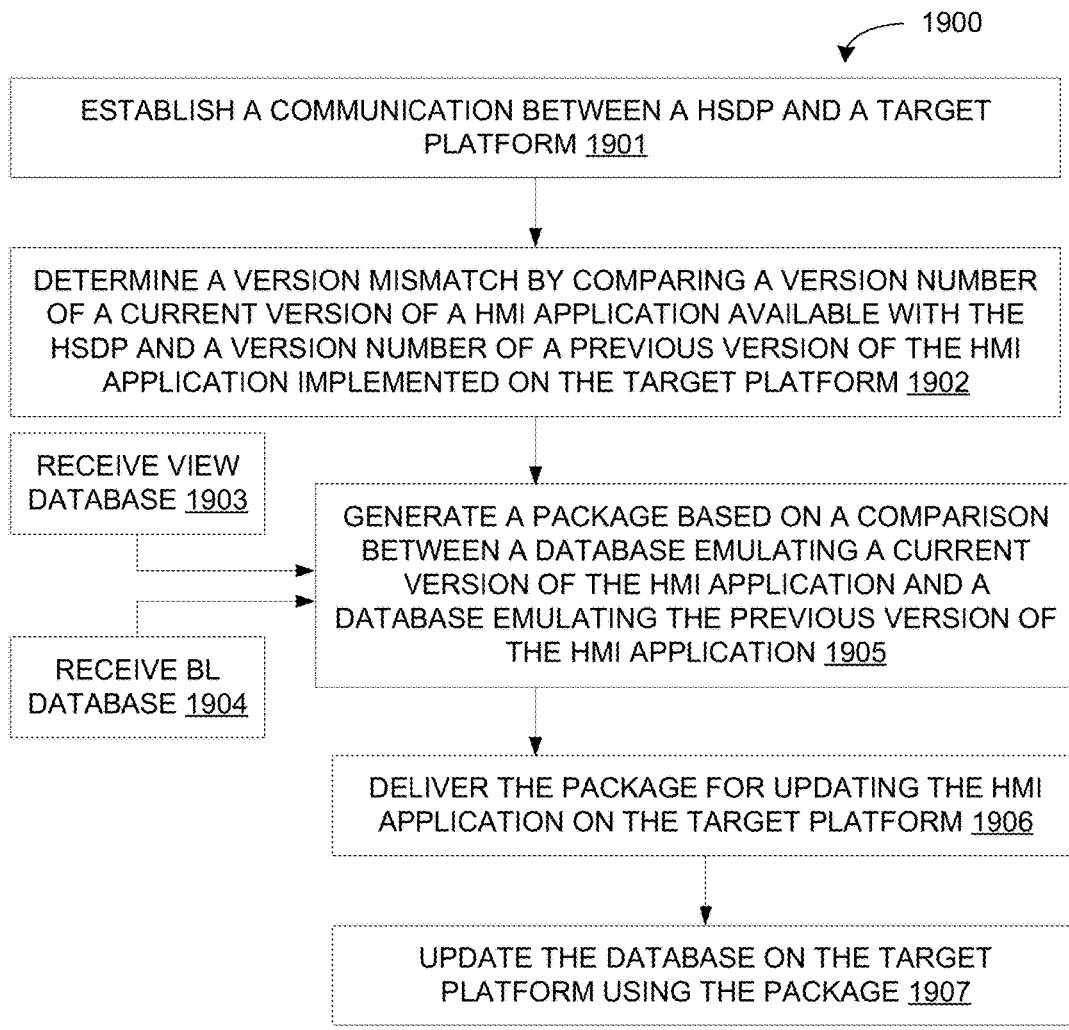
FIG. 19 is a flow diagram of a detailed exemplary process for delivering the update on the HMI application from the HSDP to the target platform, in accordance with some embodiments of the present disclosure.

Referring now to FIG. 19, exemplary control logic 1900 for delivering the update on the HMI application from the HSDP to the target platform is depicted in greater detail via a flowchart, in accordance with some embodiments of the present disclosure. As illustrated in the flowchart, at step 1901, a communication may be established between the HSDP and the target platform. At step 1902, a version mismatch between a HMI application installed on the target platform and a HMI application available with the HSDP may be determined. The version mismatch may be determined by comparing a version number of a current version of the HMI application available with the HSDP and a version number of a previous version of the HMI application implemented on the target platform. At step 1903, the HSDP may receive a view database corresponding to the current version of the HMI application and the previous version of the HMI application. Similarly, at step 1904, the HSDP may receive a BL database corresponding to the current version of the HMI application and the previous version of the HMI application. As will be appreciated, the HSDP may receive the view database and the BL database from respective sources. As discussed above, in some alternative embodiments, the HSDP may itself develop and have view database and the BL database. It should be noted that the view database and the BL database may be implemented in respective database schema.

At step 1905, the HSDP may generate a delivery package based on a comparison between the view and the BL databases emulating a current version of the HMI application and the view and the BL databases emulating the previous version of the HMI application, respectively. The delivery package may be generated by querying a snapshot view table of the respective database. The snapshot view table may be created based on a difference between the database schema of the view and the BL databases of the current version of the HMI application and database schema of the view and the BL databases of the previous version of the HMI application. The package may include a synchronization command and content associated with the synchronization command based on the query. At step 1906, the HSDP may deliver package for updating the HMI application on the target platform. The package may be delivered from the HSDP to the target platform using OMA-DS protocol. At step 1907, the target platform may update the view and the BL databases implemented on the target platform based on the received package.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific control logics.

Figure 20:
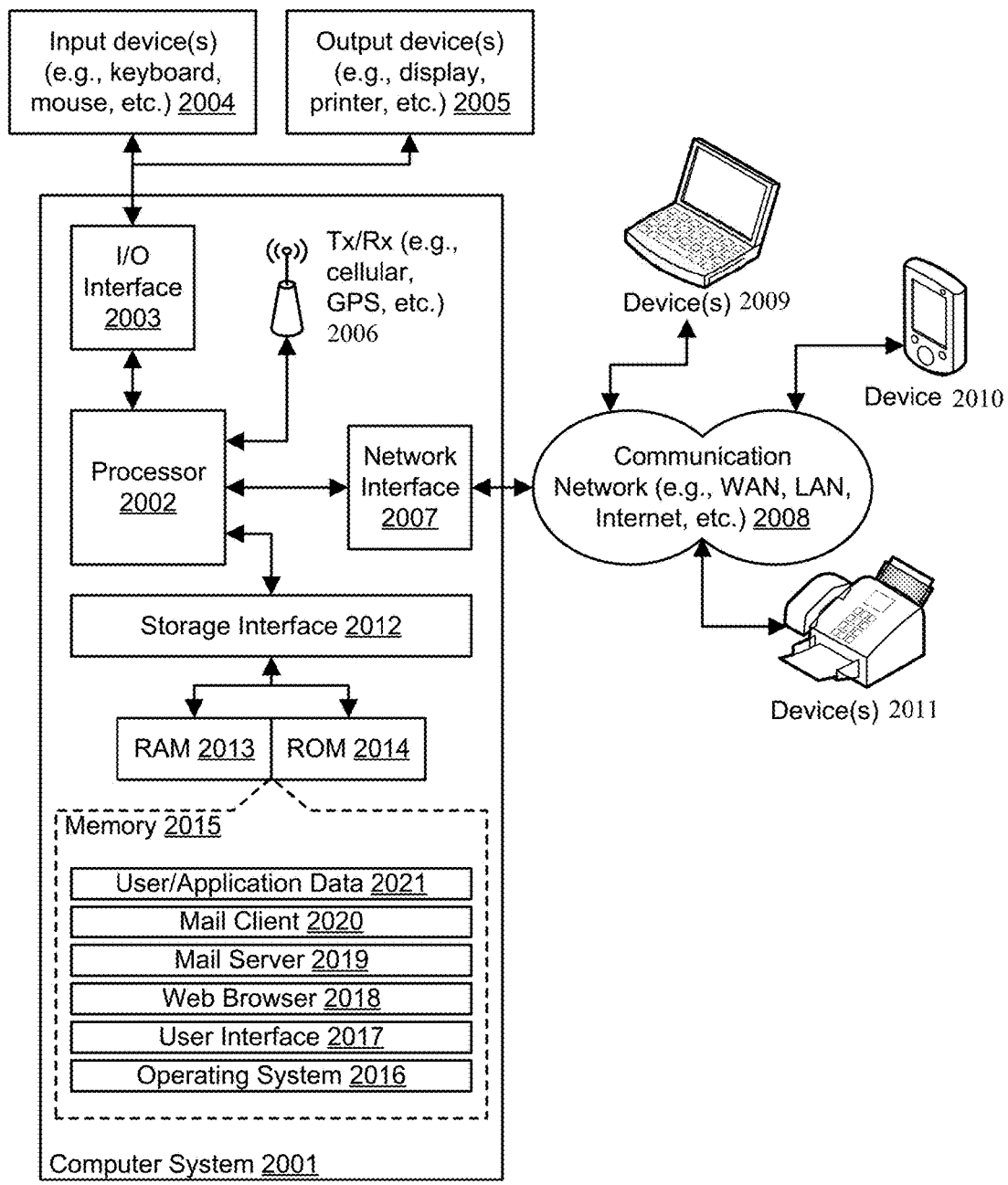
FIG. 20 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 20, a block diagram of an exemplary computer system 2001 for implementing embodiments consistent with the present disclosure is illustrated. Variations of computer system 2001 may be used for implementing system 100, HSDP 101, target platform 102, view database generator 103, and BL database generator 104 for developing and delivering re-configurable HMI application using cloud based HaaS. Computer system 2001 may include a central processing unit ("CPU" or "processor") 2002. Processor 2002 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 2002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 2002 may be disposed in communication with one or more input/output (I/O) devices via I/O interface 2003. The I/O interface 2003 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 2003, the computer system 2001 may communicate with one or more I/O devices. For example, the input device 2004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 2005 may be a printer, fax machine, video display (e.g., cathode ray tube (CRT), liquid crystal display (LCD), light-emitting diode (LED), plasma, or the like), audio speaker, etc. In some embodiments, a transceiver 2006 may be disposed in connection with the processor 2002. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 2002 may be disposed in communication with a communication network 2008 via a network interface 2007. The network interface 2007 may communicate with the communication network 2008. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 2008 may include, without limitation, a direct interconnection, local area network (LAN), wide area network (WAN), wireless network (e.g., using Wireless Application Protocol), the Internet, etc. Using the network interface 2007 and the communication network 2008, the computer system 2001 may communicate with devices 2009, 2010, and 2011. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 2001 may itself embody one or more of these devices.

In some embodiments, the processor 2002 may be disposed in communication with one or more memory devices (e.g., RAM 2013, ROM 2014, etc.) via a storage interface 2012. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 2016, user interface application 2017, web browser 2018, mail server 2019, mail client 2020, user/application data 2021 (e.g., any data variables or data records discussed in this disclosure), etc. The operating system 2016 may facilitate resource management and operation of the computer system 2001. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 2017 may facilitate display, execution, interaction, manipulation, or operation of program components through textual or graphical facilities. For example, user interfaces may provide computer interaction interface elements on a display system operatively connected to the computer system 2001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 2001 may implement a web browser 2018 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 2001 may implement a mail server 2019 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 2001 may implement a mail client 2020 stored program component. The mail client may be a mail viewing application, such as Apple Mail, Microsoft Entourage, Microsoft Outlook, Mozilla Thunderbird, etc.

In some embodiments, computer system 2001 may store user/application data 2021, such as the data, variables, records, etc. (e.g., view specification, BL specification, view database, BL database, IDE, editor, IDF, modeling tools, protocol packages, mapping of data, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for a rapid development, validation, delivery, and deployment of HMI application. In some embodiments, the techniques may facilitate concurrent validation while developing the HMI application. The techniques described above may further provide for an efficient, effective, and user-friendly delivery platform for updating re-configurable HMI application using HaaS. As will be appreciated, in some embodiments, OEMs may provide HaaS to users as a value added feature for their product to enhance the user experience. By way of the above techniques, it is, therefore, possible to periodically update the HMI to bring in variations with respect to latest advances and improvements in the HMI application, and to maintain the level of engagement of the user.

The techniques provide for delivering of decoupled view database and BL database from the HSDP platform to the target platform so as to deliver or update the HMI applications. In other words, the techniques may provide for either complete installation of or reconfiguring of the view and the BL databases based on the target platform. Thus, the techniques may facilitate development, delivery, and deployment of the HMI application without requiring complete re-installation and in a technology agnostic manner. Furthermore, the techniques provide for a highly configurable HMI application design that may facilitate for faster development and deployment, while providing the HMI application with high scalability. Also, the techniques provide for faster enhancement and functional validation of view and BL database.

In some embodiments, the techniques provide for a cloud service for HMI application development that provides contents for view and BL database generation independently without use of any code development. Thus, the view and the BL databases may be generated for HMI application development based on the contents provided by the service platform (i.e. the HSDP). The view and the BL databases may then be delivered to the target platform from the service platform to the target platform using the HSI. As will be appreciated, the DSI at the target platform may check the version of the view and BL databases at the HSDP and the target platform. For databases that are not compact and compatible, data synchronization may be performed using OMA DS protocol based on the target platform.

The specification has described method and system for developing and delivering the re-configurable HMI application from the HSDP on the target platform. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of delivering an update on a human machine interface (HMI) application to a target platform, the method implemented by one or more host service delivery platform (HSDP) computing devices and comprising:
    determining a need for updating an HMI application on a target platform implementing a previous version of the HMI application;
    generating, based on the need, a package based on a comparison between two or more databases emulating a current version of the HMI application and the previous version of the HMI application, wherein the two or more of the databases are implemented using two or more database schemas, wherein the two or more databases comprise at least a view database and a business logic (BL) database with respect to a version of the HMI application, the view database is generated based on a view specification of the HMI application and the BL database is generated based on a BL specification of the HMI application; and
    delivering the package for updating the HMI application on the target platform.

2. The method of claim 1, further comprising:
    establishing a communication with the target platform; and
    determining a version mismatch by comparing a version number of the current version of the HMI application and another version number of the previous version of the HMI application implemented on the target platform.

3. The method of claim 1, wherein the view database and the BL database are decoupled from each other.

4. The method of claim 1, wherein the two or more database schemas comprise:
    a first database schema of the view database defines at least one of an application, an interface, a container, a widget, a property, or an image; or
    a second database schema of the BL database defines at least one of a function, an application, a state, a state function, a state action, a trigger, an action function, a guard function, or a transition.

5. The method of claim 1, further comprising querying a snapshot view table of the two or more of the databases, wherein the snapshot view table is created based on a difference between a first database schema of the current version of the HMI application and a second database schema of the previous version of the HMI application, the snapshot view table comprises one or more of a GUID field, a version field, an operation field, a TypeID field, or a TypeKey field, the package comprises, based on the query, a synchronization command and a content associated with the synchronization command, and the synchronization command comprises at least one of an insert, a modify, or a delete.

6. The method of claim 1, further comprising delivering the package to the target platform using an Open Mobile Alliance-Data Synchronization (OMA-DS) protocol.

7. A host service delivery platform (HSDP) computing device comprising memory comprising programmed instructions stored thereon and a processor configured to be capable of executing the stored programmed instructions to:
    determine a need for updating a human machine interface (HMI) application on a target platform implementing a previous version of the HMI application;
    generate, based on the need, a package based on a comparison between two or more databases emulating a current version of the HMI application and the previous version of the HMI application, wherein the two or more of the databases are implemented using two or more database schemas, wherein the two or more databases comprise at least a view database and a business logic (BL) database with respect to a version of the HMI application, the view database is generated based on a view specification of the HMI application and the BL database is generated based on a BL specification of the HMI application; and
    deliver the package for updating the HMI application on the target platform.

8. The HSDP computing device of claim 7, wherein the processor is further configured to be capable of executing the stored programmed instructions to:
    establish a communication with the target platform; and
    determine a version mismatch by comparing a version number of the current version of the HMI application and another version number of the previous version of the HMI application implemented on the target platform.

9. The HSDP computing device of claim 7, wherein the view database and the BL database are decoupled from each other.

10. The HSDP computing device of claim 7, wherein the two or more database schemas comprise:
    a first database schema of the view database defines at least one of an application, an interface, a container, a widget, a property, or an image; or
    a second database schema of the BL database defines at least one of a function, an application, a state, a state function, a state action, a trigger, an action function, a guard function, or a transition.

11. The HSDP computing device of claim 7, wherein the processor is further configured to be capable of executing the stored programmed instructions to query a snapshot view table of the two or more of the databases, wherein the snapshot view table is created based on a difference between a first database schema of the current version of the HMI application and a second database schema of the previous version of the HMI application, the snapshot view table comprises one or more of a GUID field, a version field, an operation field, a TypeID field, or a TypeKey field, the package comprises, based on the query, a synchronization command and a content associated with the synchronization command, and the synchronization command comprises at least one of an insert, a modify, or a delete.

12. The HSDP computing device of claim 7, wherein the processor is further configured to be capable of executing the stored programmed instructions to deliver the package to the target platform using an Open Mobile Alliance-Data Synchronization (OMA-DS) protocol.

13. A non-transitory computer readable medium having stored thereon instructions for delivering an update on a human machine interface (HMI) application to a target platform comprising executable code which when executed by one or more processors, causes the processors to:
   determine a need for updating an HMI application on a target platform implementing a previous version of the HMI application;
   generate, based on the need, a package based on a comparison between two or more databases emulating a current version of the HMI application and the previous version of the HMI application, wherein the two or more of the databases are implemented using two or more database schemas, wherein the two or more databases comprise at least a view database and a business logic (BL) database with respect to a version of the HMI application, the view database is generated based on a view specification of the HMI application and the BL database is generated based on a BL specification of the HMI application; and
   deliver the package for updating the HMI application on the target platform.

14. The non-transitory computer readable medium of claim 13, wherein the executable code when executed by the processors further causes the processors to:
   establish a communication with the target platform; and
   determine a version mismatch by comparing a version number of the current version of the HMI application and another version number of the previous version of the HMI application implemented on the target platform.

15. The non-transitory computer readable medium of claim 13, wherein the view database and the BL database are decoupled from each other.

16. The non-transitory computer readable medium of claim 13, wherein the two or more database schemas comprise:
   a first database schema of the view database defines at least one of an application, an interface, a container, a widget, a property, or an image; or
   a second database schema of the BL database defines at least one of a function, an application, a state, a state function, a state action, a trigger, an action function, a guard function, or a transition.

17. The non-transitory computer readable medium of claim 13, wherein the executable code when executed by the processors further causes the processors to query a snapshot view table of the two or more of the databases, wherein the snapshot view table is created based on a difference between a first database schema of the current version of the HMI application and a second database schema of the previous version of the HMI application, the snapshot view table comprises one or more of a GUID field, a version field, an operation field, a TypeID field, or a TypeKey field, the package comprises, based on the query, a synchronization command and a content associated with the synchronization command, and the synchronization command comprises at least one of an insert, a modify, or a delete.

18. The non-transitory computer readable medium of claim 13, wherein the executable code when executed by the processors further causes the processors to deliver the package to the target platform using an Open Mobile Alliance-Data Synchronization (OMA-DS) protocol.

* * * * *